United States Patent
Akiyama

(10) Patent No.: US 11,333,962 B2
(45) Date of Patent: *May 17, 2022

(54) LIGHT SOURCE APPARATUS AND PROJECTOR

(71) Applicant: SEIKO EPSON CORPORATION, Tokyo (JP)

(72) Inventor: Koichi Akiyama, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/123,173

(22) Filed: Dec. 16, 2020

(65) Prior Publication Data

US 2021/0181615 A1   Jun. 17, 2021

(30) Foreign Application Priority Data

Dec. 16, 2019  (JP) .............................. JP2019-226353

(51) Int. Cl.
  *G03B 21/20*   (2006.01)
  *G02B 27/28*   (2006.01)
  *G02B 5/30*    (2006.01)

(52) U.S. Cl.
  CPC ....... *G03B 21/2073* (2013.01); *G02B 5/3083* (2013.01); *G02B 27/283* (2013.01); *G03B 21/204* (2013.01); *G03B 21/208* (2013.01)

(58) Field of Classification Search
  CPC .............. G03B 21/2073; G03B 21/204; G03B 21/208; G02B 5/3083; G02B 27/283
  USPC .......................................................... 353/20
  See application file for complete search history.

(56) References Cited

U.S. PATENT DOCUMENTS

| | | |
|---|---|---|
| 2003/0090597 A1 | 5/2003 | Katoh et al. |
| 2009/0190074 A1 | 7/2009 | Woo et al. |
| 2013/0027670 A1 | 1/2013 | Akiyama et al. |
| 2016/0170260 A1 | 6/2016 | Wachi et al. |
| 2018/0239228 A1 | 8/2018 | Akiyama et al. |
| 2019/0101815 A1* | 4/2019 | Maeda ................. G02B 27/283 |

(Continued)

FOREIGN PATENT DOCUMENTS

| | | |
|---|---|---|
| EP | 0465171 | 10/1996 |
| EP | 0905542 | 5/2006 |
| JP | H 04-060538 | 2/1992 |

(Continued)

*Primary Examiner* — Jerry L Brooks
(74) *Attorney, Agent, or Firm* — Dority & Manning, P.A.

(57) ABSTRACT

A light source apparatus according to an aspect of the present disclosure includes a light source section, a first polarization separator that transmits a first polarization component of first light and reflects a second polarization component of the first light, a second polarization separator that reflects the first polarization component, transmits a third polarization component of second light, and reflects a fourth polarization component of the second light, a diffuser that diffuses the second polarization component and causes the diffused second polarization component, and a wavelength converter that converts the wavelength of the first polarization component and causes the second light. The first polarization separator includes a first polarization separation layer and first bases. The second polarization separator includes a second polarization separation layer and second bases. At least one of the first bases and the second bases is made of quartz.

19 Claims, 10 Drawing Sheets

(56) References Cited

U.S. PATENT DOCUMENTS

2020/0285138 A1  9/2020 Kurata
2021/0181616 A1* 6/2021 Akiyama ............. G02B 5/3083

FOREIGN PATENT DOCUMENTS

| | | | |
|---|---|---|---|
| JP | 410142408 A * | 5/1998 | ............... G02B 5/04 |
| JP | H 11-109285 | 4/1999 | |
| JP | H 11-295652 | 10/1999 | |
| JP | 2000-131762 | 5/2000 | |
| JP | 2000-147500 | 5/2000 | |
| JP | 2002-335471 | 11/2002 | |
| JP | 2005-221885 | 8/2005 | |
| JP | 2009-157357 | 7/2009 | |
| JP | 2013-167812 | 8/2013 | |
| JP | 2015-025835 | 2/2015 | |
| JP | 2016-170390 | 9/2016 | |
| JP | 2017-211482 | 11/2017 | |

* cited by examiner

LIGHT SOURCE APPARATUS AND PROJECTOR

The present application is based on, and claims priority from JP Application Serial Number 2019-226353, filed Dec. 16, 2019, the disclosure of which is hereby incorporated by reference herein in its entirety.

BACKGROUND

1. Technical Field

The present disclosure relates to a light source apparatus and a projector.

2. Related Art

There is a known projector that modulates the light outputted from a light source to generate image light based on image information and projects the generated image light. JP-A-4-60538 discloses a projection-type color image display apparatus including a light source, a plurality of dichroic mirrors, a liquid crystal display device including a microlens array, and a projection lens. The projection-type color image display apparatus separates white light outputted from the light source into a plurality of color light fluxes having different colors and causes the plurality of separated color light fluxes to be incident on different sub-pixels in one liquid crystal display device for color display.

In the projection-type color image display apparatus described above, a red light reflecting dichroic mirror, a green light reflecting dichroic mirror, and a blue light reflecting dichroic mirror are disposed in nonparallel to each other along a light incident optical axis of the white light outputted from the light source. The white light outputted from the light source passes through the dichroic mirrors described above, which separate the white light into red light, green light, and blue light that travel in directions different from one another. The red light, the green light, and the blue light are incident on red sub-pixels, green sub-pixels, and blue sub-pixels of a light modulator with the red light, the green light, and the blue light spatially separated from one another by microlenses provided on the light incident side of the light modulator.

In the projection-type color image display apparatus disclosed in JP-A-4-60538, a lamp light source, such as a halogen lamp and a xenon lamp, is employed as the white light source, and a liquid crystal display device is employed as the light modulator. The light outputted from the lamp light source is nonpolarized light, and using the liquid crystal display device as the light modulator requires the light incident on the liquid crystal display device to be linearly polarized light having a specific polarization direction. On the other hand, as an illuminator that uniformly illuminates the liquid crystal display device, it is conceivable that a pair of multi-lens arrays that divide light incident thereon into a plurality of sub-light fluxes and a polarization converter that aligns the polarization directions of the plurality of sub-light fluxes with one another are provided between the white light source and the liquid crystal display device. In this case, a frequently used polarization converter includes a plurality of polarization separation layers and a plurality of reflection layers alternately arranged along a direction that intersects the light incident direction and phase retardation layers provided in the optical path of the light having passed through the polarization separation layers or the optical path of the light reflected off the reflection layers.

When the size of the projection-type color image display apparatus described above is reduced to meet the need of size reduction in recent years, however, it is difficult to manufacture a polarization converter having a small interval between the polarization separation layers and the reflection layers. It is therefore difficult to reduce the size of a light source apparatus including a polarization converter of this type and in turn the size of a projector including the light source apparatus. In view of the problems described above, it is desired to provide a light source apparatus capable of outputting a plurality of color light fluxes having an aligned polarization direction without using a small-interval polarization converter.

SUMMARY

To achieve the object described above, a light source apparatus according to an aspect of the present disclosure includes a light source section that outputs first light that belongs to a first wavelength band, a first polarization separator that transmits in a first direction a first polarization component of the first light incident from the light source section along the first direction and reflects a second polarization component of the first light in a second direction that intersects the first direction, a second polarization separator that is disposed in a position shifted in the first direction from the first polarization separator, reflects in the second direction the first polarization component incident from the first polarization separator along the first direction, transmits a third polarization component of second light that belongs to a second wavelength band different from the first wavelength band in a third direction that is opposite the second direction, and reflects a fourth polarization component of the second light in a fourth direction that is opposite the first direction, a diffuser that is disposed in a position shifted in the second direction from the first polarization separator, diffuses the second polarization component incident from the first polarization separator along the second direction, and causes the diffused second polarization component to exit in the third direction, and a wavelength converter that is disposed in a position shifted in the second direction from the second polarization separator, converts a wavelength of the first polarization component incident from the second polarization separator along the second direction, and causes the second light to exit in the third direction. The first polarization separator includes a first polarization separation layer and first bases so provided as to sandwich the first polarization separation layer. The second polarization separator includes a second polarization separation layer and second bases so provided as to sandwich the second polarization separation layer. At least one of the first bases and the second bases is made of quartz.

A light source apparatus according to another aspect of the present disclosure includes a light source section that outputs first light that belongs to a first wavelength band, a first polarization separator that transmits in a first direction a first polarization component of the first light incident from the light source section along the first direction and reflects a second polarization component of the first light in a second direction that intersects the first direction, a second polarization separator that is disposed in a position shifted in the first direction from the first polarization separator, reflects in the second direction the first polarization component incident from the first polarization separator along the first direction, transmits a third polarization component of second light that belongs to a second wavelength band different from the first wavelength band in a third direction that is opposite the second direction, and reflects a fourth polarization component of the second light in a fourth direction that is opposite the first direction, a diffuser that is disposed in a position shifted in the second direction from the first polarization separator, diffuses the second polarization component incident from the first polarization separator along the second direction, and causes the diffused second polarization component to exit in the third direction, and a wavelength converter that is disposed in a position shifted in the second direction from the second polarization separator, converts a wavelength of the first polarization component incident from the second polarization separator along the second direction, and causes the second light to exit in the third direction. The first polarization separator includes a first polarization separation layer and first bases so provided as to sandwich the first polarization separation layer. The second polarization separator includes a second polarization separation layer and second bases so provided as to sandwich the second polarization separation layer. At least one of the first bases and the second bases is made of a material that absorbs light that belongs to the first wavelength band at a light absorption factor smaller than or equal to 0.1% per length t=10 mm, where t represents an optical path length of light in the first bases and the second bases.

A light source apparatus according to another aspect of the present disclosure includes a light source section that outputs first light that belongs to a first wavelength band, a first polarization separator that transmits in a first direction a first polarization component of the first light incident from the light source section along the first direction and reflects a second polarization component of the first light in a second direction that intersects the first direction, a second polarization separator that is disposed in a position shifted in the first direction from the first polarization separator, reflects in the second direction the first polarization component incident from the first polarization separator along the first direction, transmits a third polarization component of second light that belongs to a second wavelength band different from the first wavelength band in a third direction that is opposite the second direction, and reflects a fourth polarization component of the second light in a fourth direction that is opposite the first direction, a diffuser that is disposed in a position shifted in the second direction from the first polarization separator, diffuses the second polarization component incident from the first polarization separator along the second direction, and causes the diffused second polarization component to exit in the third direction, and a wavelength converter that is disposed in a position shifted in the second direction from the second polarization separator, converts a wavelength of the first polarization component incident from the second polarization separator along the second direction, and causes the second light to exit in the third direction. The first polarization separator includes a first polarization separation layer and first bases so provided as to sandwich the first polarization separation layer. The second polarization separator includes a second polarization separation layer and second bases so provided as to sandwich the second polarization separation layer. At least one of the first bases and the second bases is made of a material having a photoelastic constant smaller than or equal to 0.1 nm/cm/$10^5$ Pa.

The light source apparatus according to any of the aspects of the present disclosure may further include a first phase retarder which is provided between the first polarization separator and the diffuser and on which the second polarization component is incident from the first polarization separator.

The light source apparatus according to any of the aspects of the present disclosure may further include a second phase retarder that converts the third polarization component that exits out of the second polarization separator in the third direction into the fourth polarization component.

In the light source apparatus according to any of the aspects of the present disclosure, the light source section may include a light emitting device and a third phase retarder on which light outputted from the light emitting device is incident and which outputs the first light containing the first polarization component and the second polarization component.

In the light source apparatus according to one of the aspects of the present disclosure, the third phase retarder may be rotatable around an axis of rotation along a traveling direction of light incident on the third phase retarder.

The light source apparatus according to any of the aspects of the present disclosure may further include a first color separator that is disposed in a position shifted in the third direction from the first polarization separator and separates light that exits out of the first polarization separator into third light that belongs to the first wavelength band and fourth light that belongs to the second wavelength band and a second color separator that is disposed in a position shifted in the third direction from the second polarization separator and separates light that exits out of the second polarization separator into fifth light that belongs to a third wavelength band different from the second wavelength band and sixth light that belongs to a fourth wavelength band different from the second wavelength band and the third wavelength band.

A projector according to another aspect of the present disclosure include the light source apparatus according one of the aspects of the present disclosure, a light modulator that modulates light from the light source apparatus in accordance with image information, and a projection optical apparatus that projects the light modulated by the light modulator.

The projector according to the aspect of the present disclosure may further include a homogenizer provided between the light source apparatus and the light modulator, and the homogenizer may include two multi-lenses that divide the light incident from the light source apparatus into a plurality of sub-light fluxes and a superimposing lens that superimposes the plurality of sub-light fluxes incident from the two multi-lenses on one another on the light modulator.

In the projector according to the aspect of the present disclosure, the light modulator may include a liquid crystal panel having a plurality of pixels and a microlens array provided on a light incident side of the liquid crystal panel and including a plurality of microlenses corresponding to the plurality of pixels. The plurality of pixels may each have a first sub-pixel, a second sub-pixel, a third sub-pixel, and a fourth sub-pixel. The microlenses may cause the third light to be incident on the first sub-pixels, the fourth light to be incident on the second sub-pixels, the fifth light to be incident on the third sub-pixels, and the sixth light to be incident on the fourth sub-pixels.

DESCRIPTION OF EXEMPLARY EMBODIMENTS

First Embodiment

A first embodiment of the present disclosure will be described below with reference to FIGS. 1 to 8.

Figure 1:
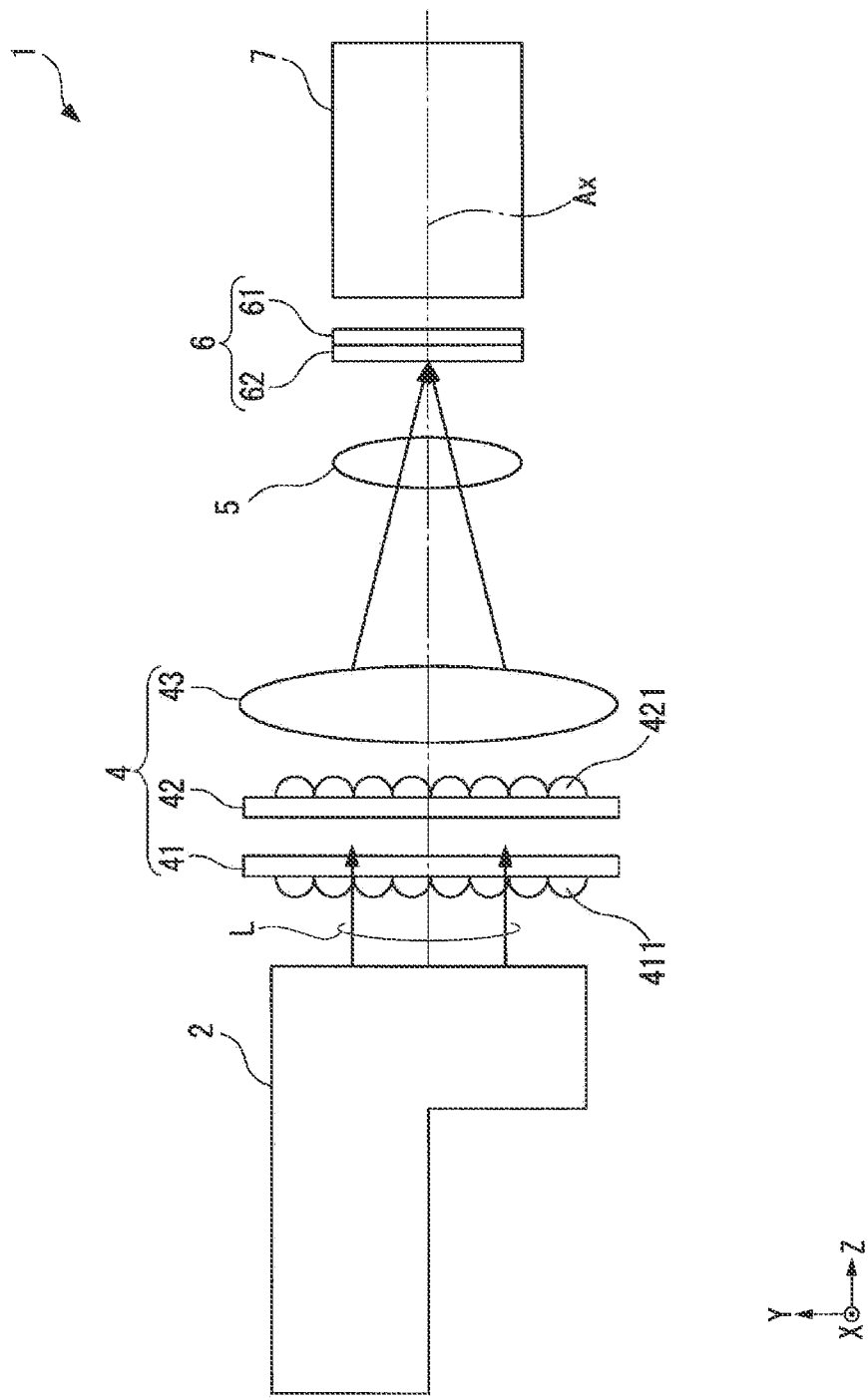
FIG. 1 is a schematic configuration diagram of a projector according to a first embodiment.

FIG. 1 is a schematic configuration diagram of a projector 1 according to the present embodiment.

In the following drawings, components are drawn at different dimensional scales in some cases for clarity of each of the components.

The projector 1 according to the present embodiment modulates light outputted from a light source apparatus 2 to form an image according to image information and enlarges and projects the formed image on a projection receiving surface, such as a screen. In other words, the projector 1 causes a light modulator 6 including one liquid crystal panel 61 to modulate the light outputted from the light source apparatus 2 to form an image and projects the formed image. The projector 1 is what is called a single-panel projector.

The projector 1 includes the light source apparatus 2, a homogenizer 4, a field lens 5, the light modulator 6, and a projection optical apparatus 7, as shown in FIG. 1. The light source apparatus 2, the homogenizer 4, the field lens 5, the light modulator 6, and the projection optical apparatus 7 are disposed in predetermined positions along an illumination optical axis Ax. The illumination optical axis Ax is defined as an axis along the traveling direction of the chief ray of light L outputted from the light source apparatus 2.

The configurations of the light source apparatus 2 and the homogenizer 4 will be described later in detail.

The field lens 5 is disposed between the homogenizer 4 and the light modulator 6. The field lens 5 parallelizes the light L having exited out of the homogenizer 4 and guides the parallelized light L to the light modulator 6.

The projection optical apparatus 7 projects the light modulated by the light modulator 6, that is, image forming light on a projection receiving surface (not shown), such as a screen. The projection optical apparatus 7 includes one or more projection lenses.

In the following description, an axis parallel to the traveling direction of the light outputted from the light source apparatus 2 along the illumination optical axis Ax is called an axis Z, and the traveling direction of the light is called a direction +Z. Two axes perpendicular to the axis Z and perpendicular to each other are called axes X and Y. Out of the directions along the axes described above, the upward direction of the vertical direction in the space where the projector 1 is installed is called a direction +Y. The rightward direction of the horizontal direction when a target object on which the light is incident along the direction +Z is so viewed that the direction +Y is oriented upward in the vertical direction is called a direction +X. Although not shown, the direction opposite the direction +X is called a direction −X, the direction opposite the direction +Y is called a direction −Y, and the direction opposite the direction +Z is called a direction −Z.

The direction +X in the present embodiment corresponds to the first direction in the appended claims, and the direction −Z in the present embodiment corresponds to the second direction in the appended claims. The direction +Z in the present embodiment corresponds to the third direction in the appended claims, and the direction −X in the present embodiment corresponds to the second direction in the appended claims.

Configuration of Light Source Apparatus

Figure 2:
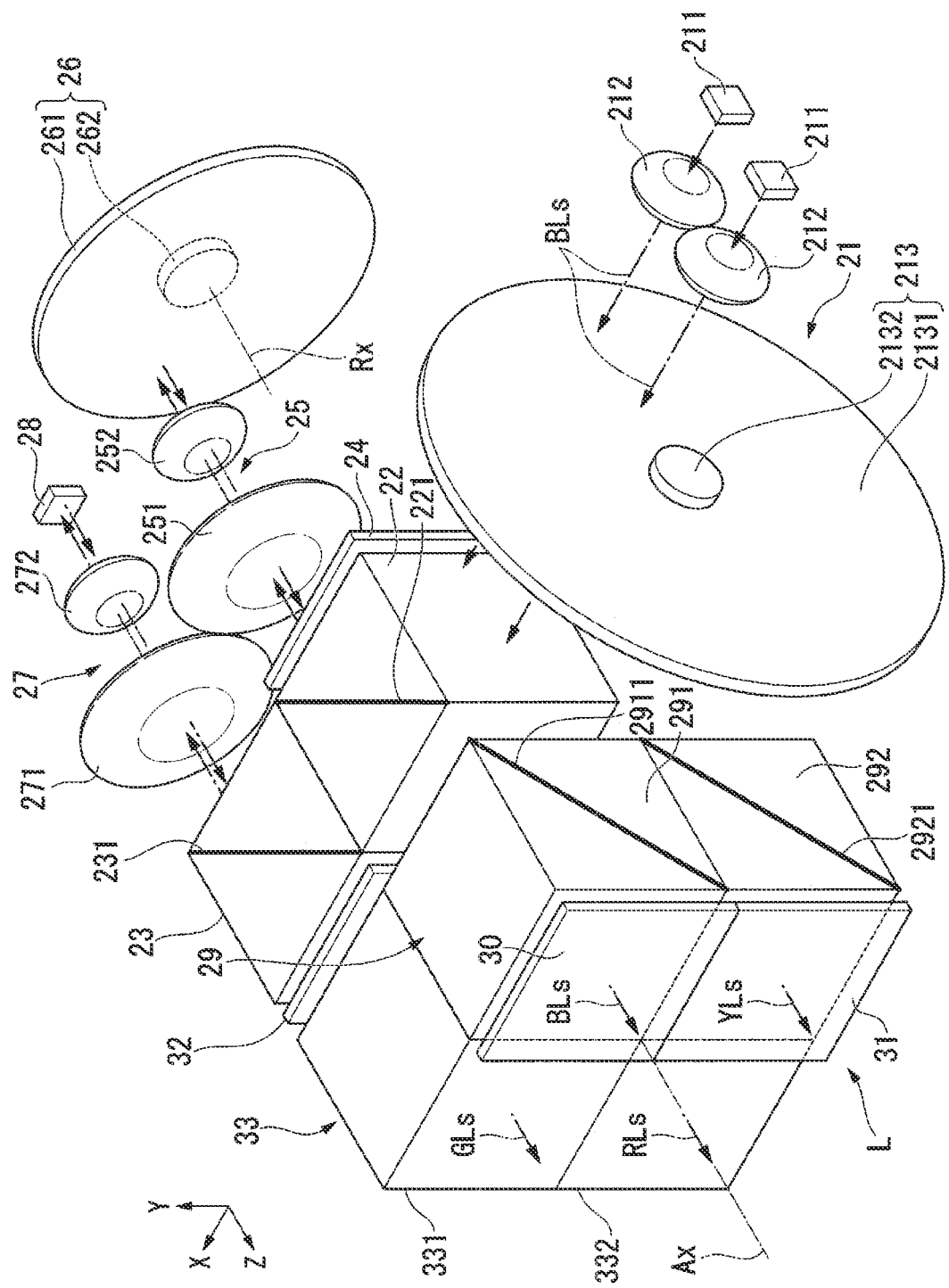
FIG. 2 is a perspective view of a light source apparatus according to the first embodiment.
Figure 3:
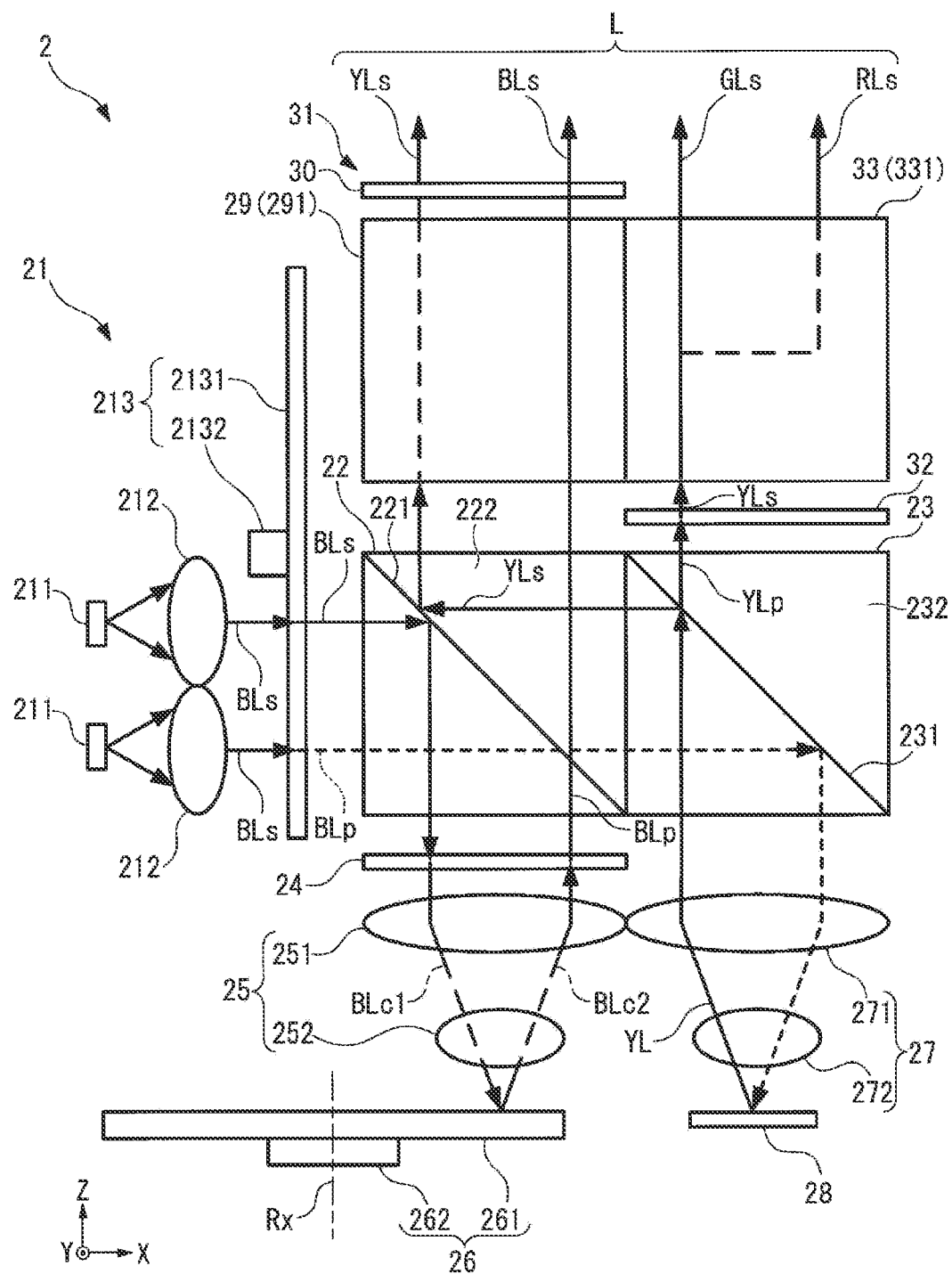
FIG. 3 is a plan view of the light source apparatus viewed from the positive side of a direction Y.

FIG. 2 is a perspective view of the light source apparatus 2 according to the present embodiment. FIG. 3 is a plan view of the light source apparatus 2 viewed from the direction +Y.

The light source apparatus 2 outputs the light L, with which the light modulator 6 is illuminated, in the direction parallel to the illumination optical axis Ax, that is, in the direction +Z, as shown in FIGS. 2 and 3. The light L outputted by the light source apparatus 2 is linearly polarized light having an aligned polarization direction and contains a plurality of spatially separate color light fluxes. In the present embodiment, the light L outputted by the light source apparatus 2 is formed of four light fluxes each formed of S-polarized light. The four light fluxes are formed of blue light BLs, yellow light YLs, green light GLs, and red light RLs.

The light source apparatus 2 includes a light source section 21, a first polarization separator 22, a second polarization separator 23, a first phase retarder 24, a first light collector 25, a diffusion apparatus 26, a second light collector 27, a wavelength converter 28, a first color separator 29, a fourth phase retarder 30, a reflector 31, a second phase retarder 32, and a second color separator 33.

A P-polarization component in the present embodiment corresponds to the first polarization component in the appended claims, and an S-polarization component in the present embodiment corresponds to the second polarization component in the appended claims. Further, the first polarization separator 22 and the second polarization separator 23 differ from the first color separator 29 and the second color separator 33 in terms of the orientation of films that separate the polarization components or the color light fluxes from each other. Therefore, the P-polarization component and the S-polarization component are expressed by the polarization direction with respect to the first polarization separator 22 and the second polarization separator 23 and are reversed for the polarization direction with respect to the first color separator 29 and the second color separator 33. That is, the P-polarization component with respect to the first polarization separator 22 and the second polarization separator 23 is the S-polarization component with respect to the first color separator 29 and the second color separator 33, and the S-polarization component with respect to the first polarization separator 22 and the second polarization separator 23 is the P-polarization component with respect to the first color separator 29 and the second color separator 33. It is, however, noted that the P-polarization component and the S-polarization component are hereinafter expressed for the polarization direction with respect to the first polarization separator 22 and the second polarization separator 23 to avoid confused description.

Configuration of Light Source Section

The light source section 21 outputs blue light BLs, which enters the first polarization separator 22, along the direction +X. The light source section 21 includes a plurality of light emitters 211, a plurality of collimator lenses 212, and a rotary phase retardation apparatus 213. The light emitters 211 are each formed of a solid-state light source that outputs the blue light BLs. Specifically, the light emitters 211 are each formed of a semiconductor laser that outputs S-polarized blue light BLs. The blue light BLs is laser light that belongs to a blue wavelength band, for example, from 440 to 480 nm and has a peak wavelength that falls within, for example, a range from 450 to 460 nm. That is, the light source section 21 outputs the blue light BLs that belongs to the blue wavelength band. In the present embodiment, the plurality of light emitters 211 are arranged along the axis Z. The light source section 21 in the present embodiment includes two light emitters 211, but the number of light emitters 211 is not limited to a specific number and may be one. The arrangement of the plurality of light emitters 211 is also not limited to a specific arrangement. The light emitters 211 are so disposed as to output the blue light BLs formed of the S-polarized component and may instead be so disposed as to output blue light formed of the P-polarized component because the rotary phase retardation apparatus 213 can arbitrarily set the ratio between the amount of S-polarized light and the amount of P-polarized light. That is, the light emitters 211 may be rotated by 90° around the optical axis of the outputted light.

The blue light BLs that belongs to the blue wavelength band in the present embodiment corresponds to the first light that belongs to a first wavelength band in the appended claims.

The plurality of collimator lenses 212 are provided between the plurality of light emitters 211 and the rotary phase retardation apparatus 213. The collimator lenses 212 are each provided in correspondence with one of the light emitters 211. The collimator lenses 212 parallelize the light L outputted from the light emitters 211.

The rotary phase retardation apparatus 213 includes a third phase retarder 2131 and a rotator 2132. The third phase retarder 2131 is rotatable around an axis of rotation along the traveling direction of the light incident on the third phase retarder 2131, that is, an axis of rotation parallel to the axis X. The rotator 2132 is formed, for example, of a motor and rotates the third phase retarder 2131.

The third phase retarder 2131 is formed of a half wave plate or a quarter wave plate. Part of the blue light BLs formed of the S-polarized component having entered the third phase retarder 2131 is converted by the third phase retarder 2131 into blue light BLp formed of the P-polarized component. The blue light having passed through the third phase retarder 2131 is therefore the mixture of the blue light BLs formed of the S-polarized component and the blue light BLp formed of the P-polarized component mixed at a predetermined ratio. That is, the third phase retarder 2131 receives the blue light BLs outputted from the light emitters 211 and outputs the blue light containing the S-polarized component and the P-polarized component.

The rotator 2132 adjusts the angle of rotation of the third phase retarder 2131 to adjust the ratio between the amount of blue light BLs formed of the S-polarized component and the amount of blue light BLp formed of the P-polarized component contained in the light that passes through the third phase retarder 2131. The rotator 2132, which rotates the third phase retarder 2131, may not be provided when no adjustment of the ratio between the amount of blue light BLs and the amount of blue light BLp is necessary. In this case, the angle of rotation of the third phase retarder 2131 is so set that the ratio between the amount of blue light BLs and the amount of blue light BLp is a preset ratio, and the angle of rotation of the third phase retarder 2131 is then fixed.

The light source section 21 thus outputs the light containing the blue light BLs formed of the S-polarized component and the blue light BLp formed of the P-polarized component. In the present embodiment, the plurality of light emitters 211 are each configured to output the blue light BLs formed of the S-polarized component, and a light emitter 211 that outputs the blue light BLs formed of the S-polarized component and a light emitter 211 that outputs the blue light BLp formed of the P-polarized component may be mixed with each other. According to the configuration described above, the rotary phase retardation apparatus 213 can be omitted. Further, the light emitters 211 are not necessarily each formed of a semiconductor laser and may each be formed of another solid-state light source, such as an LED (light emitting diode).

Configuration of First Polarization Separator

The light containing the blue light BLs formed of the S-polarized component and the blue light BLp formed of the P-polarized component enters the first polarization separator 22 along the direction +X. The first polarization separator 22 is formed of a prism-shaped polarization separator. The first polarization separator 22 includes a first polarization separation layer 221 and two first bases 222, which are so provided as to sandwich the first polarization separation layer 221. Specifically, the two first bases 222 each have the shape of a substantially right-angled isosceles triangular column. The two first bases 222 are combined with each other with the inclining surfaces thereof facing each other into a substantially box-like shape as a whole. The first polarization separation layer 221 is provided between the inclining surfaces of the two first bases 222. The first polarization separation layer 221 therefore inclines by 45° with respect to the axes X and Z. In other words, the first polarization separation layer 221 inclines by 45° with respect to the planes XY and YZ.

The first polarization separation layer 221 has a polarization separation characteristic that causes the first polarization separation layer 221 to transmit the P-polarized component of the incident light and reflect the S-polarized component of the incident light. The first polarization separation layer 221 further has a wavelength selective polarization separation characteristic that causes the first polarization separation layer 221 to transmit P-polarized light and reflect S-polarized light of light that belongs to the blue wavelength band and reflect light having wavelengths longer than those in the blue wavelength band irrespective of the polarization state of the incident light. The first polarization separator 22 therefore transmits along the direction +X the blue light BLp formed of the P-polarized component out of the blue light incident on the first polarization separator 22 along the direction +X and reflects along the direction −Z the blue light BLs formed of the S-polarized component out of the incident blue light. The first polarization separation layer 221 is formed, for example, of a dielectric multilayer film.

In the present embodiment, the first bases 222 are made of quartz. Quartz absorbs light that belongs to the blue wavelength band at a light absorption factor of about 0.01% per length t=10 mm, where t represents the optical path length of the light in the first bases 222. That is, quartz is a material having a light absorption factor smaller than or equal to 0.1. Quartz is broadly classified into fused quartz produced by fusing natural crystallized quartz powder and synthetic quartz that hardly contains metal impurities and is chemically synthesized. In the present embodiment, synthetic quartz is desirably used.

The first bases 222 are instead made of a material having a photoelastic constant smaller than or equal to 0.1 nm/cm/$10^5$ Pa. As an example of a specific material of the first bases 222, PBH56 (product name, manufactured by OHARA Inc.), which is one type of optical glass, can be used. PBH56 is a low-photoelastic optical glass material having a refractive index nd of 1.84139 and a photoelastic constant of 0.09 nm/cm/$10^5$ Pa.

Configuration of Second Polarization Separator

The second polarization separator 23 is disposed in a position shifted in the direction +X from the first polarization separator 22. The blue light BLp formed of the P-polarized component having passed through the first polarization separator 22 enters the second polarization separator 23. The second polarization separator 23 is formed of a prism-shaped polarization separator, as the first polarization separator 22 is. The second polarization separator 23 includes a second polarization separation layer 231 and two second bases 232, which are so provided as to sandwich the second polarization separation layer 231.

Specifically, the two second bases 232 each have the shape of a substantially right-angled isosceles triangular column. The two second bases 232 are combined with each other with the inclining surfaces thereof facing each other into a substantially box-like shape as a whole. The second polarization separation layer 231 is provided between the inclining surfaces of the two second bases 232. The second polarization separation layer 231 therefore inclines by 45° with respect to the axes X and Z. In other words, the second polarization separation layer 231 inclines by 45° with respect to the planes XY and YZ. The second polarization separation layer 231 is disposed in parallel to the first polarization separation layer 221.

The second polarization separation layer 231 has a wavelength selective polarization separation characteristic that causes the second polarization separation layer 231 to reflect blue light, reflect the S-polarized light out of light having wavelengths longer than those in the blue wavelength band, and transmit P-polarized light out of the light. The second polarization separator 23 therefore reflects in the direction −Z the blue light BLp formed of the P-polarized component incident from the first polarization separator 22. The second polarization separation layer 231 is formed, for example, of a dielectric multilayer film.

In the present embodiment, the second bases 232 are made of quartz, which is a material that absorbs light that belongs to the blue wavelength band at the light absorption factor smaller than or equal to 0.1% per length t=10 mm, as the first bases 222 are. Synthetic quartz is desirably used as the quartz. The second bases 232 are instead made of a low-photoelastic optical glass material having a photoelastic constant smaller than or equal to 0.1 nm/cm/$10^5$ Pa, such as PBH56 described above.

In the present embodiment, the first polarization separator 22 and the second polarization separator 23 are configured to be separate members. The first polarization separator 22 and the second polarization separator 23 are therefore bonded to each other, although not shown, via a bonding material provided between surfaces of the polarization separators that are the surfaces facing each other. The first polarization separator 22 and the second polarization separator 23 may instead be integrated with each other. That is, the first base 222 adjacent to the second polarization separator 23 and the second base 232 adjacent to the first polarization separator 22 may be a common member made of a single material.

In the present embodiment, the first bases 222 and the second bases 232 are both made of quartz. In place of the configuration described above, one of the first bases 222 and the second bases 232 may be made of quartz that is a material that absorbs light that belongs to the blue wavelength band at the light absorption factor smaller than or equal to 0.1% per length t=10 mm. Instead, one of the first bases 222 and the second bases 232 may be made of a material having a photoelastic constant smaller than or equal to 0.1 nm/cm/$10^5$ Pa.

Configuration of First Phase Retarder

The first phase retarder 24 is located in a position shifted in the direction −Z from the first polarization separator 22. That is, the first phase retarder 24 is disposed between the first polarization separator 22 and the diffusion apparatus 26 along the axis Z. The first phase retarder 24 is formed of a quarter wave plate for the wavelength of the blue light BLs and the blue light BLp incident thereon. The blue light BLs formed of the S-polarized component reflected off the first polarization separator 22 is converted by the first phase retarder 24, for example, into right-handed circularly polarized blue light BLc1, which then exits toward the first light collector 25. That is, the first phase retarder 24 converts the polarization state of the blue light BLs incident thereon.

Configuration of First Light Collector

The first light collector 25 is disposed in a position shifted in the direction −Z from the first phase retarder 24. That is, the first light collector 25 is disposed between the first phase retarder 24 and the diffusion apparatus 26 along the axis Z. The first light collector 25 collects the blue light BLc1 incident from the first phase retarder 24 into a spot on a diffusion plate 261 of the diffusion apparatus 26. Further, the first light collector 25 parallelizes blue light Blc2, which will be described later and is incident from the diffusion apparatus 26. In the example shown in FIG. 2, the first light collector 25 is formed of a first lens 251 and a second lens 252, but the number of lenses that form the first light collector 25 is not limited to a specific number.

Configuration of Diffusion Apparatus

The diffusion apparatus 26 is disposed in a position shifted in the direction −Z from the first light collector 25. That is, the diffusion apparatus 26 is disposed in a position shifted in the direction −Z from the first polarization separator 22. The diffusion apparatus 26 diffusively reflects in the direction +Z the blue light BLc1 incident in the direction −Z from the first light collector 25 at the same angle of diffusion as that of yellow light YL emitted from the wavelength converter 28, which will be described later. The diffusion apparatus 26 includes the diffusion plate 261 and a rotator 262. The diffusion plate 261 preferably has a reflection characteristic as close as possible to the Lambert scattering characteristic and reflects the blue light BLc1 incident on the reflection plate 261 over a wide angular range. The rotator 262 is formed, for example, of a motor and rotates the diffusion plate 261 around an axis of rotation Rx parallel to the direction +Z.

The diffusion plate 261 in the present embodiment corresponds to the diffuser in the appended claims.

The blue light BLc1 incident on the diffusion plate 261 is converted, when reflected off the diffusion plate 261, into the blue light BLc2, which is circularly polarized light having a polarization rotation direction opposite the polarization rotation direction of the incident blue light BLc1. That is, the right-handed circularly polarized blue light BLc1 is converted by the diffusion plate 261 into the left-handed circularly polarized blue light BLc2. The blue light BLc2 outputted from the diffusion apparatus 26 passes in the direction +Z through the first light collector 25 and then enters the first phase retarder 24 again. In this process, the blue light BLc2 that enters the first phase retarder 24 via the first light collector 25 is converted by the first phase retarder 24 into the blue light BLp formed of the P-polarized component. The converted blue light BLp passes through the first polarization separator 22 in the direction +Z and enters the first color separator 29.

Configuration of Second Light Collector

The second light collector 27 is disposed in a position shifted in the direction −Z from the second polarization separator 23. That is, the second light collector 27 is disposed between the second polarization separator 23 and the wavelength converter 28 along the axis Z. The second light collector 27 collects the blue light BLp reflected off the second polarization separator 23 into a spot on the wavelength converter 28. Further, the second light collector 27 parallelizes the yellow light YL, which is emitted from the wavelength converter 28 and will be described later, and causes the parallelized yellow light YL to exit toward the second polarization separator 23. In the example shown in FIG. 2, the second light collector 27 is formed of a first lens 271 and a second lens 272, but the number of lenses that form the second light collector 27 is not limited to a specific number.

Configuration of Wavelength Converter

The wavelength converter 28 is disposed in a position shifted in the direction −Z from the second light collector 27. That is, the wavelength converter 28 is disposed in a position shifted in the direction −Z from the second polarization separator 23. The wavelength converter 28 is a reflective wavelength converter that is excited with light incident thereon and emits light having a wavelength different from the wavelength of the incident light in the direction opposite the light incident direction. In other words, the wavelength converter 28 converts the wavelength of the incident light and emits the light converted in terms of wavelength in the direction opposite the light incident direction.

In the present embodiment, the wavelength converter 28 contains a yellow phosphor that emits yellow light when excited with blue light. Specifically, the wavelength converter 28 contains, for example, an yttrium-aluminum-garnet-based (YAG-based) phosphor containing cerium (Ce) as the activator. The wavelength converter 28 emits in the direction +Z fluorescence that belongs to a yellow wavelength band formed of wavelengths longer than those in the blue wavelength band to which the blue light BLp, which is incident along the direction −Z, belongs, that is, the nonpolarized yellow light YL. The yellow light YL belongs, for example, to a wavelength band from 500 to 700 nm. The yellow light YL contains a green light component and a red light component that are each a mixture of the S-polarized component and the P-polarized component.

The fluorescence that belongs to the yellow wavelength band in the present embodiment, that is, the nonpolarized yellow light YL corresponds to the second light that belongs to a second wavelength band in the appended claims.

The yellow light YL emitted from the wavelength converter 28 passes along the direction +Z through the second light collector 27, which parallelizes the yellow light YL, and the parallelized yellow light YL then enters the second polarization separator 23. The wavelength converter 28 in the present embodiment is an immobile wavelength converter. In place of the configuration described above, the wavelength converter 28 may be a rotary wavelength converter including a rotator that rotates the wavelength converter 28 around an axis of rotation parallel to the axis Z. In this case, an increase in temperature of the wavelength converter 28 is suppressed, whereby the wavelength conversion efficiency of the wavelength converter 28 can be increased.

The second polarization separation layer 231 of the second polarization separator 23 has the wavelength selective polarization separation characteristic for light that belongs to the yellow wavelength band, as described above. Therefore, out of the nonpolarized yellow light YL incident on the second polarization separation layer 231, the yellow light YLs formed of the S-polarized component is reflected off the second polarization separation layer 231 in the direction −X and enters the first polarization separator 22. The first polarization separation layer 221 of the first polarization separator 22 is so characterized as to reflect the yellow light YLs irrespective of the polarization state thereof, as described above. The yellow light YLs incident on the first polarization separation layer 221 along the direction −X is therefore reflected off the first polarization separator 22 in the direction +Z and enters the first color separator 29.

On the other hand, out of the nonpolarized yellow light YL incident on the second polarization separation layer 231, yellow light YLp formed of the P-polarized component passes through the second polarization separation layer 231 in the direction +Z, exits out of the second polarization separator 23, and enters the second phase retarder 32.

The yellow light YLp formed of the P-polarized component in the present embodiment corresponds to the third polarization component in the appended claims, and the yellow light YLs formed of the S-polarized component in the present embodiment corresponds to the fourth polarization component in the appended claims.

Configuration of First Color Separator

Figure 4:
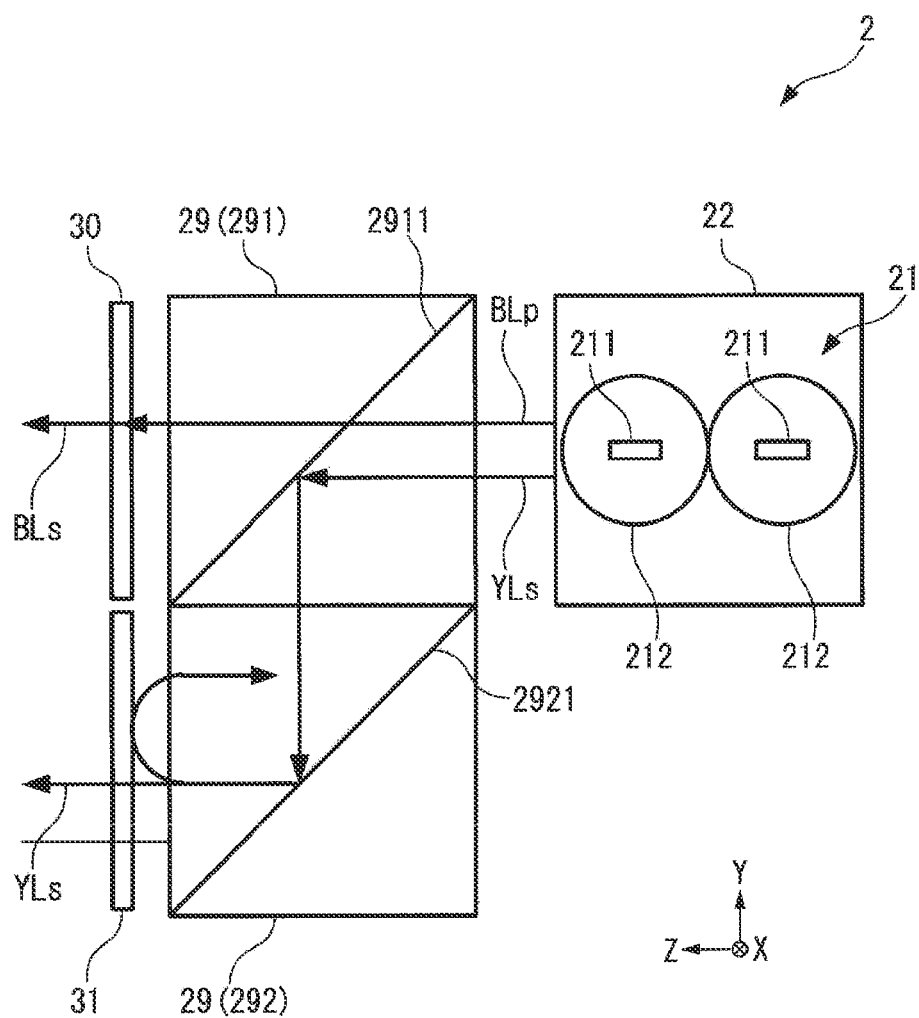
FIG. 4 is a side view of the light source apparatus viewed from the negative side of a direction X.

FIG. 4 is a side view of the light source apparatus 2 viewed from the direction −X. That is, FIG. 4 shows the first color separator 29, the fourth phase retarder 30, the reflector 31, and other components viewed from the direction −X. In FIG. 4, the rotary phase retardation apparatus 213, the first phase retarder 24, the first light collector 25, the diffusion apparatus 26, and other components are omitted for ease of illustration.

The first color separator 29 is disposed in a position shifted in the direction +Z from the first polarization separator 22, as shown in FIG. 4. The first color separator 29 includes a dichroic prism 291 and the reflection prism 292. The dichroic prism 291 and the reflection prism 292 are disposed side by side along the axis Y. The first color separator 29 separates the light having exited in the direction +Z out of the first polarization separator 22 into the blue light BLp and the yellow light YLs.

The light containing the blue light BLp and the yellow light YLs having exited out of the first polarization separator 22 enters the dichroic prism 291. The dichroic prism 291 is formed of a prism-shaped color separator formed by combining two bases each being a substantially right-angled isosceles triangular column with each other into a substantially box-like shape. A color separation layer 2911 is provided at the interface between the two bases. The color separation layer 2911 inclines by 45° with respect to the axes Y and Z. In other words, the color separation layer 2911 inclines by 45° with respect to the planes XY and YZ.

The color separation layer 2911 functions as a dichroic mirror that transmits blue light out of the incident light and reflects color light having wavelengths longer than those in the blue wavelength band, that is, yellow light out of the incident light. Therefore, out of the light having entered the dichroic prism 291 from the first polarization separator 22, the blue light BLp passes through the color separation layer 2911 in the direction +Z and exits out of the dichroic prism 291.

On the other hand, out of the light having entered the dichroic prism 291 from the first polarization separator 22, the yellow light YLs is reflected off the color separation layer 2911 in the direction −Y. The dichroic prism 291 may be replaced with a dichroic mirror including the color separation layer 2911. The first color separator 29 may instead include a polarization separator having a polarization separation layer and the reflection prism 292. Even when the dichroic prism 291 is replaced, for example, with as the first color separator 29 a polarization separator that transmits the incident blue light BLp in the direction +Z and reflects the yellow light YLs in the direction −Y toward the reflection prism 292, the polarization separator can separate the blue light BLp and the yellow light YLs from each other, as the first color separator 29 including the dichroic prism 291 can.

The reflection prism 292 is disposed in a position shifted in the direction −Y from the dichroic prism 291. The yellow light YLs reflected off the color separation layer 2911 enters the reflection prims 292. The reflection prism 292 is a prism-shaped reflector formed by combining two bases each being a substantially right-angled isosceles triangular column with each other into a substantially box-like shape. A reflection layer 2921 is provided at the interface between the two bases. The reflection layer 2921 inclines by 45° with respect to the directions +Y and +Z. In other words, the reflection layer 2921 inclines by 45° with respect to the planes XY and YZ. That is, the reflection layer 2921 is disposed in parallel to the color separation layer 2911.

The reflection layer 2921 reflects in the direction +Z the yellow light YLs incident from the dichroic prism 291 in the direction −Y. The yellow light YLs reflected off the reflection layer 2921 exits in the direction +Z out of the reflection prism 292. The reflection prism 292 may be replaced with a reflection mirror including the reflection layer 2921.

Configuration of Fourth Phase Retarder

The fourth phase retarder 30 is disposed in a position shifted in the direction +Z from the dichroic prism 291. In other words, the fourth phase retarder 30 is disposed in the optical path of the blue light BLp having exited out of the dichroic prism 291. The fourth phase retarder 30 is formed of a half wave plate for the blue wavelength band to which the blue light BLp incident thereon belongs. The fourth phase retarder 30 converts the blue light BLp incident from the dichroic prism 291 into the blue light BLs formed of the S-polarized component. The converted blue light BLs formed of the S-polarized component from the fourth phase retarder 30 exits out of the light source apparatus 2 in the direction +Z and enters the homogenizer 4 shown in FIG. 1. The fourth phase retarder 30 may be so provided as to be in contact with a surface of the dichroic prism 291 that is the surface via which the blue light BLp exits.

Configuration of Reflector

The reflector 31 is disposed in a position shifted in the direction +Z from the reflection prism 292. In other words, the reflector 31 is disposed in the optical path of the yellow light YLs having exited out of the reflection prism 292. The reflector 31 is formed of a half-silvered mirror that transmits part of the light incident thereon and reflects the remainder.

It is, however, noted that the transmittance and reflectance provided by the half-silvered mirror may be arbitrarily set in accordance with the white balance of the light L outputted from the light source apparatus 2. For example, the transmittance is set at 80%, and the reflectance is set at 20'.

Therefore, out of the yellow light YLs incident on the reflector 31, part of the yellow light YLs passes through the reflector 31 and exits out of the light source apparatus 2 in the direction +Z and enters the homogenizer 4. That is, the yellow light YLs is spatially separated from the blue light BLs, exits via a light exiting position on the light source apparatus 2 that is the position different from the light exiting position via which the blue light BLs exits, and enters the homogenizer 4. In detail, the yellow light YLs exits via the light exiting position separate in the direction −Y from the light exiting position on the light source apparatus 2 that is the position via which the blue light BLs exits, and the yellow light YLs then enters the homogenizer 4.

On the other hand, the remainder of the yellow light YLs incident on the reflector 31 is reflected off the reflector 31 and enters the reflection prism 292 again. The remainder of the yellow light YLs having entered the reflection prism 292 is reflected off the reflection layer 2921 in the direction +Y and incident on the wavelength converter 28 via the dichroic prism 291, the first polarization separator 22, the second polarization separator 23, and the second light collector 27.

The yellow phosphor contained in the wavelength converter 28 hardly absorbs yellow light externally incident thereon. The yellow light YLs incident on the wavelength converter 28 is therefore not absorbed in the wavelength converter 28 but is repeatedly reflected or scattered in the wavelength converter 28 to form the nonpolarized yellow light YL. The nonpolarized yellow light YL exits out of the wavelength converter 28 again along with the yellow light YL newly generated in the yellow phosphor. The yellow light YL emitted from the wavelength converter 28 then enters the second polarization separator 23 via the second light collector 27, as described above. The ratio between the amount of yellow light YLs passing through the reflector 31 and the amount of yellow light YLs reflected off the reflector 31 can be set in advance, as described above. The reflector 31 may be so provided as to be in contact with a surface of the reflection prism 292 that is the surface via which the yellow light YLs exits.

Configuration of Second Phase Retarder

Figure 5:
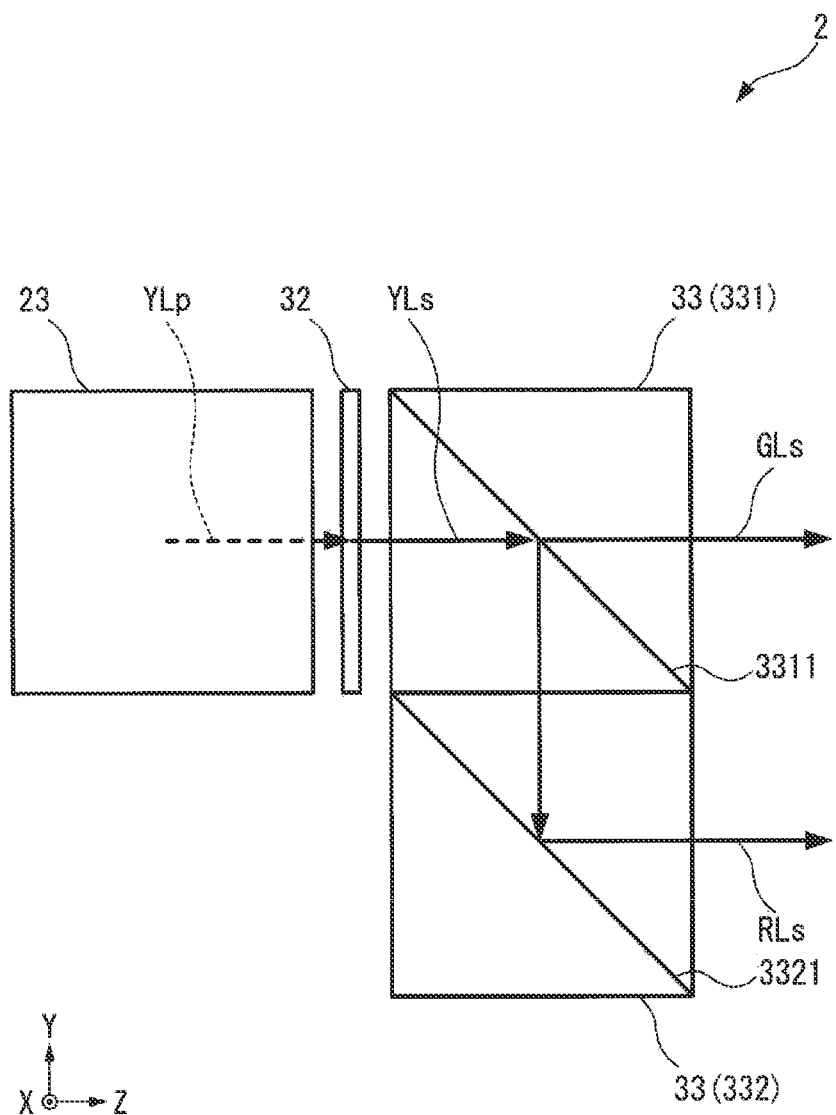
FIG. 5 is a side view of the light source apparatus viewed from the positive side of the direction X.

FIG. 5 is a side view of the light source apparatus 2 viewed from the direction +X. In other words, FIG. 5 shows the second phase retarder 32 and the second color separator 33 viewed from the direction +X. In FIG. 5, the second light collector 27 and the wavelength converter 28 are omitted.

The second phase retarder 32 is disposed in a position shifted in the direction +Z from the second polarization separator 23, as shown in FIGS. 3 and 5. The yellow light YLP having passed through the second polarization separator 23 enters the second phase retarder 32. The second phase retarder 32 is formed of a half wave plate for the yellow wavelength band to which the yellow light YLp belongs. The second phase retarder 32 converts the yellow light YLp formed of the P-polarized component into the yellow light YLs formed of the S-polarized component. The converted yellow light YLs formed of the S-polarized component enters the second color separator 33.

Configuration of Second Color Separator

The second color separator 33 is disposed in a position shifted in the direction +Z from the second phase retarder 32, as shown in FIG. 5. That is, the second color separator 33 is disposed in a position shifted in the direction +Z from the second polarization separator 23. The second color separator 33 includes a dichroic prism 331 and a reflection prism 332. The dichroic prism 331 and the reflection prism 332 are disposed side by side along the axis Y. The second color separator 33 separates the yellow light YLs having exited out of the second polarization separator 23 in the direction +Z and having been converted by the second phase retarder 32 into the S-polarized component into the green light GLs and the red light RLs.

The dichroic prism 331 is formed of a prism-shaped color separator, as the dichroic prism 291 is. A color separation layer 3311 is provided at the interface between the two bases. The color separation layer 3311 inclines by 45° with respect to the directions +Y and +Z. In other words, the color separation layer 3311 inclines by 45° with respect to the planes XY and YZ. The color separation layer 3311 is disposed in parallel to the reflection layer 3321.

The color separation layer 3311 functions as a dichroic mirror that transmits in the direction +Z the green light component out of the incident light and reflects in the direction −Y the red light component out of the incident light. Therefore, out of the yellow light YLs having entered the dichroic prism 331, the S-polarized green light GLs passes through the color separation layer 3311 in the direction +Z and exits out of the dichroic prism 331. The S-polarized green light GLs exits out of the light source apparatus 2 in the direction +Z and enters the homogenizer 4. That is, the green light GLs is spatially separated from the blue light BLs and the yellow light YLs and exits via a position different from the positions via which the blue light BLs and the yellow light YLs exit and enters the homogenizer 4. In other words, the green light GLs exits via a light exiting position on the light source apparatus 2 that is a position separate in the direction +X from the light exiting position via which the blue light BLs exits, and the green light GLs then enters the homogenizer 4.

On the other hand, out of the yellow light YLs having entered the dichroic prism 331, the red light RLs formed of the S-polarized component is reflected off the color separation layer 3311 in the direction −Y. The dichroic prism 331 may be replaced with a dichroic mirror including the color separation layer 3311.

The reflection prism 332 has the same configuration as that of the reflection prism 292. That is, the reflection prism 332 includes a reflection layer 3321 parallel to the color separation layers 2911 and 3311 and the reflection layer 2921.

The reflection layer 3321 reflects in the direction +Z the red light RLs reflected off the color separation layer 3311 and incident on the reflection layer 3321. The red light RLs reflected off the reflection layer 3321 exits out of the reflection prism 332. The red light RLs is outputted from the light source apparatus 2 in the direction +Z and enters the homogenizer 4. That is, the red light RLs is spatially separated from the blue light BLs, the yellow light YLs, and the green light GLs and exits via a position different from the positions via which the blue light BLs, the yellow light YLs, and the green light GLs exit and enters the homogenizer 4. In other words, the red light RLs exits via a light exiting position on the light source apparatus 2 that is a position separate in the direction −Y from the light exiting position via which the green light GLs exits and separate in the direction +X from the light exiting position via which the yellow light YLs exits, and the red light RLs then enters the homogenizer 4.

Configuration of Homogenizer

The homogenizer 4 homogenizes the illuminance in an image formation area of the light modulator 6 irradiated with the light outputted from the light source apparatus 2, as shown in FIG. 1. The homogenizer 4 includes a first multi-lens 41, a second multi-lens 42, and a superimposing lens 43.

The first multi-lens 41 includes a plurality of lenses 411 arranged in a matrix in a plane perpendicular to the center axis of the light L incident from the light source apparatus 2, that is, the illumination axis Ax. The plurality of lenses 411 of the first multi-lens 41 divide the light incident from the light source apparatus 2 into a plurality of sub-light fluxes.

Figure 6:
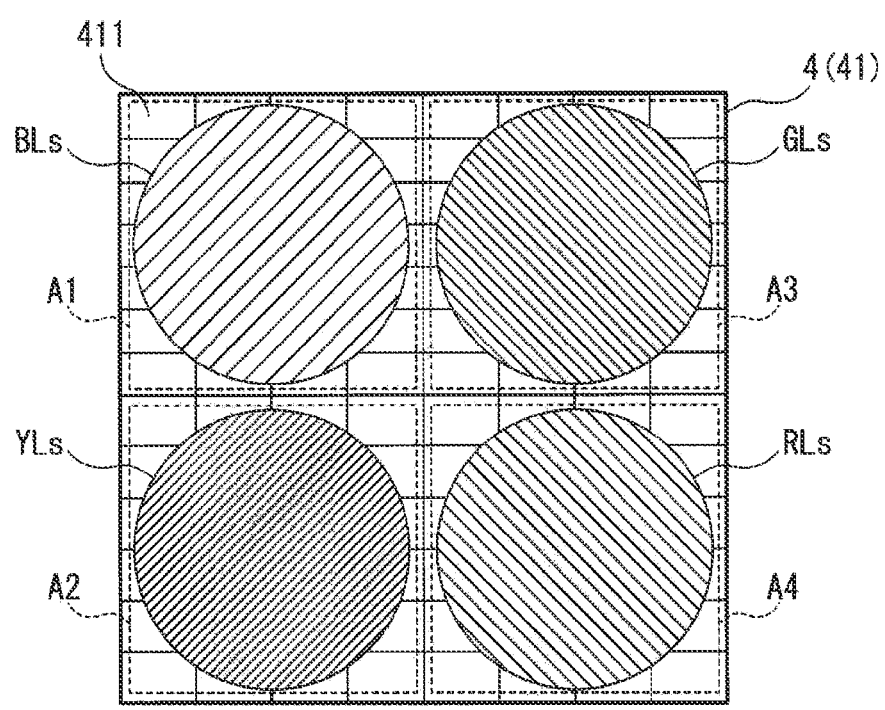
FIG. 6 is a diagrammatic view showing light incident positions on a multi-lens that are the positions where color light fluxes are incident on the multi-lens.

FIG. 6 is a diagrammatic view showing the light incident positions on the first multi-lens 41 viewed from the direction −Z that are the positions where the color light fluxes are incident on the first multi-lens 41.

The blue light BLs, the yellow light YLs, the green light GLs, and the red light RLs outputted from the light source apparatus 2 enter the first multi-lens 41, as shown in FIG. 6. The blue light BLs outputted via a position on the light source apparatus 2 that is a position shifted in the direction −X and the direction +Y enter a plurality of lenses 411 present in an area A1 of the first multi-lens 41 that is an area shifted in the direction −X and the direction +Y. The yellow light YLs outputted via a position on the light source apparatus 2 that is a position shifted in the direction −X and the direction −Y enter a plurality of lenses 411 present in an area A2 of the first multi-lens 41 that is an area shifted in the direction −X and the direction −Y.

The green light GLs outputted via a position on the light source apparatus 2 that is a position shifted in the direction +X and the direction +Y enter a plurality of lenses 411 present in an area A3 of the first multi-lens 41 that is an area shifted in the direction +X and the direction +Y. The red light RLs outputted via a position on the light source apparatus 2 that is a position shifted in the direction +X and the direction −Y enter a plurality of lenses 411 present in an area A4 of the first multi-lens 41 that is an area shifted in the direction +X and the direction −Y. The color light fluxes having entered the lenses 411 form a plurality of sub-light fluxes, which enter the lenses 421 of the second multi-lens 42 that correspond to the lenses 411.

Out of the light L outputted from the light source apparatus 2 according to the present embodiment, the blue light BLs corresponds to the third light in the appended claims, the yellow light YLs corresponds to the fourth light in the appended claim, the green light GLs corresponds to the fifth light in the appended claim, and the red light RLs corresponds to the sixth light in the appended claim.

The second multi-lens 42 includes a plurality of lenses 421, which are arranged in a matrix in a plane perpendicular to the illumination optical axis Ax and correspond to the plurality of lenses 411 of the first multi-lens 41, as shown in FIG. 1. The plurality of sub-light fluxes having exited out of the lenses 411 corresponding to the lenses 421 enter the lenses 421. The lenses 421 cause the sub-light fluxes incident thereon to enter the superimposing lens 43.

The superimposing lens 43 superimposes the plurality of sub-light fluxes incident from the second multi-lens 42 on one another in the image formation area of the light modulator 6. In detail, the second multi-lens 42 and the superimposing lens 43 cause the blue light BLs, the yellow light YLs, the green light GLs, and the red light RLs each divided into the plurality of sub-light fluxes to enter a plurality of microlenses 621, which form a microlens array 62, which will be described later, of the light modulator 6 via the field lens 5 at different angles of incidence.

Configuration of Light Modulator

The light modulator 6 modulates the light outputted from the light source apparatus 2, as shown in FIG. 1. In detail, the light modulator 6 modulates the color light fluxes outputted from the light source apparatus 2 and incident on the light modulator 6 via the homogenizer 4 and the field lens 5 in accordance with image information to form image light according to the image information. The light modulator 6 includes one liquid crystal panel 61 and one microlens array 62.

Configuration of Liquid Crystal Panel

Figure 7:
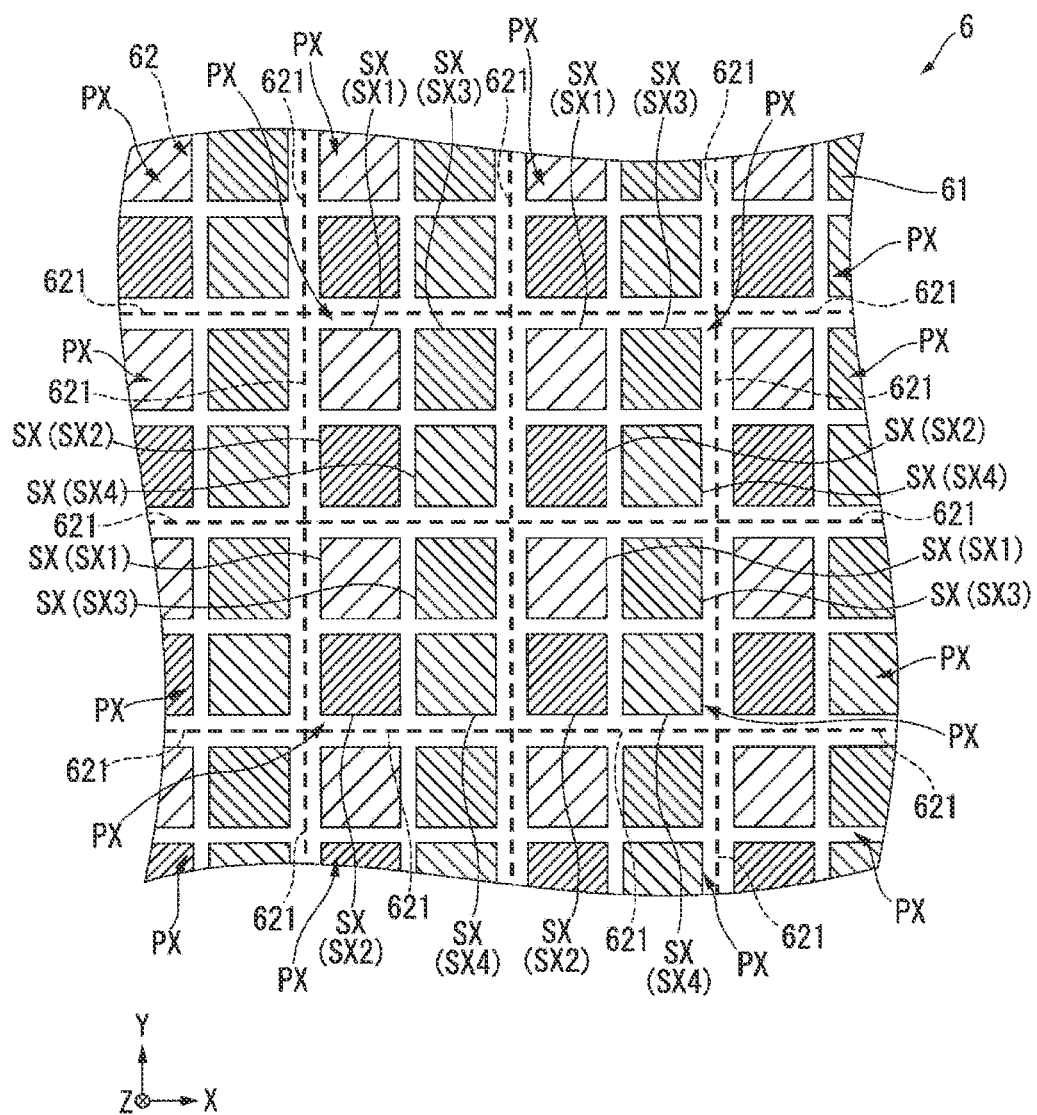
FIG. 7 is an enlarged view of a light modulator.

FIG. 7 is a diagrammatic view that is an enlarged view of part of the light modulator 6 viewed from the direction −Z. In other words, FIG. 7 shows the correspondence between pixels PX provided in the liquid crystal panel 61 and the microlenses 621 provided in the microlens array 62.

The liquid crystal panel 61 has a plurality of pixels PX arranged in a matrix in a plane perpendicular to the illumination optical axis Ax, as shown in FIG. 7.

The pixels PX each have a plurality of sub-pixels SX, which modulate color light fluxes having colors different from one another. In the present embodiment, the pixels PX each have four sub-pixels SX (SX1 to SX4). Specifically, in one pixel PX, the first sub-pixel SX1 is disposed in a position shifted in the direction −X and the direction +Y. The second sub-pixel SX2 is disposed in a position shifted in the direction −X and the direction −Y. The third sub-pixel SX3 is disposed in a position shifted in the direction +X and the direction +Y. The fourth sub-pixel SX4 is disposed in a position shifted in the direction +X and the direction −Y.

Configuration of Microlens Array

The microlens array 62 is provided on a side of the liquid crystal panel 61 that is the direction −Z, which is the light incident side, as shown in FIG. 1. The microlens array 62 guides the color light fluxes that enter the microlens array 62 to the individual pixels PX. The microlens array 62 includes a plurality of microlenses 621 corresponding to the plurality of pixels PX.

The plurality of microlenses 621 are arranged in a matrix in a plane perpendicular to the illumination optical axis Ax. In other words, the plurality of microlenses 621 are arranged in a matrix in a plane perpendicular to the center axis of the light incident via the field lens 5. In the present embodiment, the microlenses 621 are each provided in correspondence with two sub-pixels arranged in the direction +X and two sub-pixels arranged in the direction +Y. That is, the microlenses 621 are each provided in correspondence with the four sub-pixels SX1 to SX4 in the form of a matrix formed of two rows and two columns in the plane XY.

The blue light BLs, the yellow light YLs, the green light GLs, and the red light RLs superimposed by the homogenizer 4 on one another enter the microlenses 621 at different angles of incidence. The microlenses 621 cause each of the color light fluxes incident thereon to be incident on the sub-pixels SX corresponding to the color light flux. Specifically, the microlenses 621 each cause, out of the sub-pixels SX of the corresponding pixel PX, the blue light BLs to be incident on the first sub-pixel SX1, the yellow light YLs to be incident on the second sub-pixel SX2, the green light GLs to be incident on the third sub-pixel SX3, and the red light RLs to be incident on the fourth sub-pixel SX4. The color light fluxes are thus incident on the sub-pixels SX1 to SX4 corresponding to the color light fluxes, and the sub-pixels SX1 to SX4 modulate the corresponding color light fluxes. The image light thus modulated by the liquid crystal panel 61 is projected by the projection optical apparatus 7 on the projection receiving surface that is not shown.

Effects of First Embodiment

In the projector of related art described in JP-A-4-60538, a lamp is used as the light source. Since the light outputted from the lamp has polarization directions that are not aligned with one another, a polarization conversion section for aligning the polarization directions with one another is required to use a liquid crystal panel as the light modulator. The projector typically uses a polarization conversion section including a multi-lens array and a polarization separator (PBS) array. To reduce the size of the projector, however, a multi-lens array and a PBS array each having a small interval are required, but it is very difficult to produce a PBS array having a small interval.

To solve the problem described above, in the present embodiment, the light source apparatus 2 outputs four color light fluxes having an aligned polarization direction, that is, the blue light BLs formed of the S-polarized component, the yellow light YLs formed of the S-polarized component, the green light GLs formed of the S-polarized component, and the red light RLs formed of the S-polarized component. According to the configuration described above, a light source apparatus 2 capable of outputting a plurality of color light fluxes that are spatially separated from one another and have an aligned polarization direction can be achieved without use of a polarization converter having a small interval, such as that described above. The size of the light source apparatus 2 and in turn the size of the projector 1 can thus be reduced.

Further, in the projector 1 according to the present embodiment, the yellow light YLs enters the light modulator 6 in addition to the blue light BLs, the green light GLs, and the red light RLs, whereby the luminance of an image projected from the projection optical apparatus 7 can be increased.

In the present embodiment, the light source section 21 includes the third phase retarder 2131, whereby the blue light BLp formed of the P-polarized component and the blue light BLs formed of the S-polarized component are reliably allowed to enter the first polarization separator 22. Further, according to the configuration described above, since the light fluxes outputted from the plurality of light emitting devices 211 may have the same polarization direction, solid-state light sources of the same type may be disposed in the same orientation, whereby the configuration of the light source section 21 can be simplified.

In the present embodiment, since the third phase retarder 2131 is rotatable around an axis of rotation along the direction +X, adjustment of the angle of rotation of the third phase retarder 2131 allows adjustment of the ratio between the amount of blue light BLs and the amount of blue light BLp that enter the first polarization separator 22. The ratio between the amount of blue light BLs outputted from the light source apparatus 2 and the amounts of yellow light YLs, the green light GLs, and the red light RLs also outputted from the light source apparatus 2 can thus be adjusted, whereby the white balance of the light from the light source apparatus 2 can be adjusted.

In the present embodiment, the first phase retarder 24 is provided between the first polarization separator 22 and the first light collector 25, whereby the circularly polarized blue light BLc2 outputted from the diffusion apparatus 26 can be converted into the blue light BLp formed of the P-polarized component, which can pass through the first polarization separation layer 221 of the first polarization separator 22. The blue light BLc2 outputted from the diffusion apparatus 26 can thus be used with increased efficiency.

In the present embodiment, the second phase retarder 32 is provided between the second polarization separator 23 and the second color separator 33, whereby the yellow light YLp formed of the P-polarized component that exits out of the second polarization separator 23 can be converted into the yellow light YLs formed of the S-polarized component. The green light GLs and the red light RLs having exited out of the second color separator 33 can therefore each be light formed of the S-polarized component, whereby the blue light BLs, the yellow light YLs, the green light GLs, and the red light RLs outputted from the light source apparatus 2 can each be light formed of the S-polarized component.

In the present embodiment, the reflector 31, which reflects part of the yellow light YLs, is provided on the light exiting side of the first color separator 29 that is the side via which the yellow light YLs exits, whereby the ratio between the amount of yellow light YLs outputted from the light source apparatus 2 and the amounts of green light GLs and the red light RLs also outputted from the light source apparatus 2 can be adjusted. The white balance of the light from the light source apparatus 2 can thus be adjusted. Further, the luminance of a projection image can be increased by increasing the ratio of the amount of yellow light YLs to the amounts of other color light fluxes. Moreover, the color reproducibility of a projection image can be increased by increasing the ratio of the amounts of green light GLs and red light RLs to the amounts of other color light fluxes.

In the present embodiment, the light source apparatus 2 includes the first light collector 25, which collects the blue light BLs into a spot on the diffusion apparatus 26, whereby the first light collector 25 can efficiently collect the blue light BLs having exited out of the first phase retarder 24 into a spot on the diffusion apparatus 26 and parallelize the blue light BLs outputted from the diffusion apparatus 26. As a result, loss of the blue light BLs can be suppressed, whereby the blue light BLs can be used at increased efficiency.

In the present embodiment, the light source apparatus 2 includes the second light collector 27, which collects the blue light BLp into a spot on the wavelength converter 28, whereby the second light collector 27 can efficiently collect the blue light BLp having exited out of the second polarization separator 23 into a spot on the wavelength converter 28 and parallelize the yellow light YL emitted from the wavelength converter 28. As a result, loss of the blue light BLp and the yellow light YL can be suppressed, whereby the blue light BLs and the yellow light YL can be used at increased efficiency.

Consider now a light source apparatus according to Comparative Example below.

Figure 8:
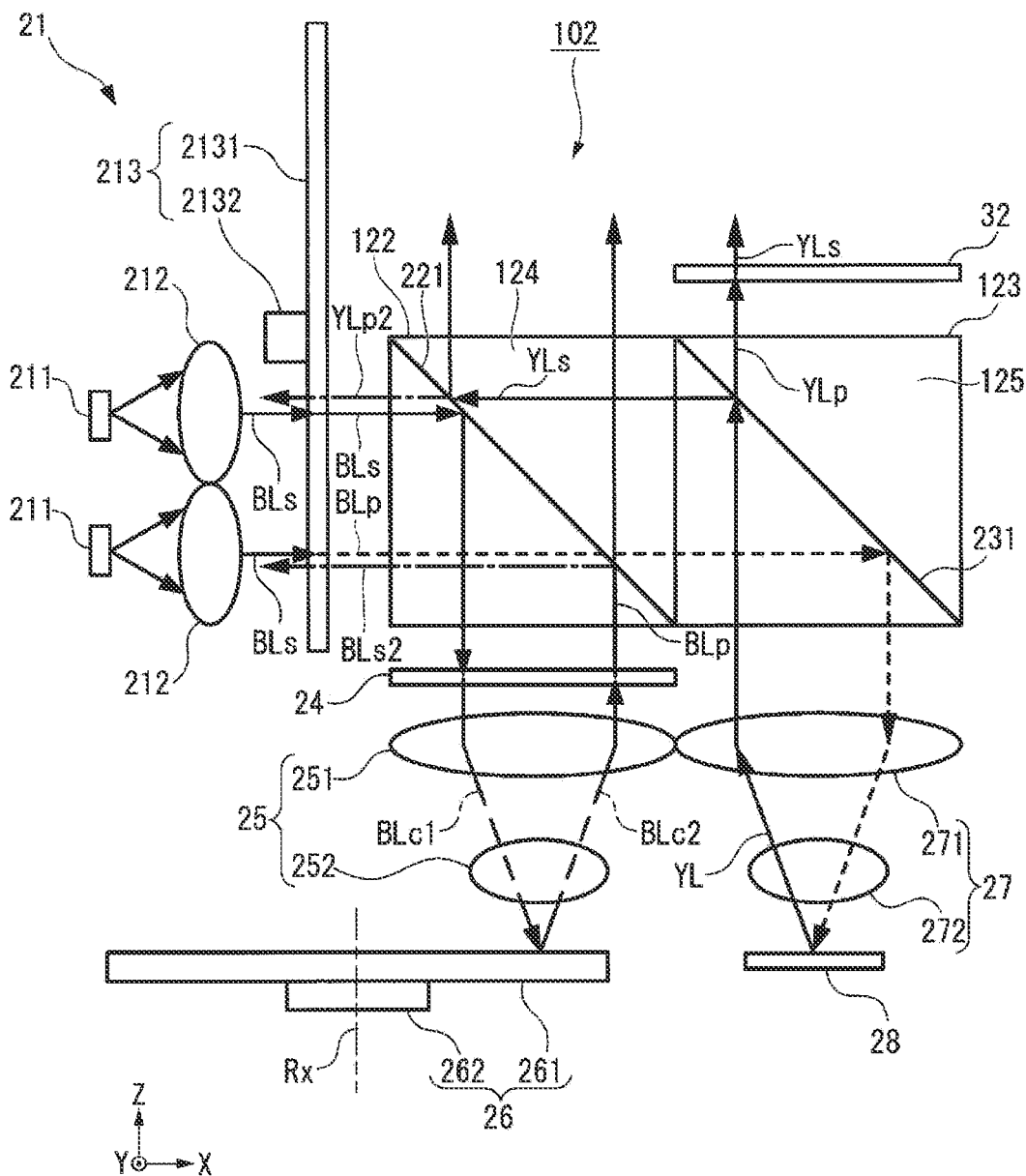
FIG. 8 is a plan view of a light source apparatus according to Comparative Example viewed from the positive side of the direction Y.

FIG. 8 is a plan view of a light source apparatus 102 according to Comparative Example viewed from the direction +Y. In FIG. 8, components common to those of the light source apparatus 2 according to the present embodiment have the same reference characters. Further, in FIG. 8, the first color separator 29, the second color separator 33, and other components are omitted.

In the light source apparatus 102 according to Comparative Example, first bases 124, of which a first polarization separator 122 is formed, are made of typical optical glass, such as borosilicate glass, a representative example of which is, for example, BK7, unlike the bases in the present embodiment, as shown in FIG. 8. Similarly, second bases 125, of which a second polarization separator 123 is formed, are made of typical optical glass, such as borosilicate glass, unlike the bases in the present embodiment. The other configurations of the light source apparatus 102 are the same as those of the light source apparatus 2 according to the present embodiment.

When the first polarization separator 122 and the second polarization separator 123 are irradiated with the light from the light source section 21, heat is generated in the first polarization separator 122 and the second polarization separator 123. In the case where the first bases 124, of which the first polarization separator 122 is formed, and the second bases 125, of which the second polarization separator 123 is formed, are made of typical optical glass, such as borosilicate glass, the first bases 124 and the second bases 125 are thermally distorted, and birefringence resulting from the thermal distortion occurs. As a result, the polarization state of the light traveling through the first polarization separator 122 and the second polarization separator 123 is disturbed.

Specifically, part of the blue light BLp formed of the P-polarized component that exits out of the first phase retarder 24, enters the first polarization separator 122, and then travels toward the first polarization separation layer 221 is changed to blue light BLs2 formed of the S-polarized component. The blue light BLs2 is then reflected off the first polarization separation layer 221 in the direction −X. Part of the yellow light YLs reflected off the second polarization separation layer 231 and then traveling toward the first polarization separation layer 221 is changed to yellow light YLp2 formed of the P-polarized component. The yellow light YLp2 then passes through the first polarization separation layer 221 in the direction −X.

The blue light BLs2 and the yellow light YLp2 form light that returns from the first polarization separator 122 to the light source section 21, resulting in optical loss. As described above, the light source apparatus 102 according to Comparative Example causes loss of the blue light and the yellow light, possibly resulting in a decrease in the light use efficiency.

To solve the problem described above, in the light source apparatus 2 according to the present embodiment, the first bases 222 and the second bases 232 are made of quartz. Quartz absorbs light that belongs to the blue wavelength band at the light absorbance factor of about 0.01% per length t=10 mm, which is sufficiently smaller than the light absorbance factor of typical optical glass. The first bases 222 or the second bases 232 are therefore hardly thermally distorted, so that birefringence hardly occurs. When the first bases 222 and the second bases 232 are made of a material having a photoelastic constant smaller than or equal to 0.1 nm/cm/$10^5$ Pa, the first bases 222 and the second bases 232 are thermally distorted, unlike in the case of quartz, but birefringence hardly occurs even when thermal distortion occurs.

Therefore, even when the first bases 222 and the second bases 232 are made of either of the materials described above, the blue light BLp formed of the P-polarized component that exits out of the first phase retarder 24, enters the first polarization separator 122, and then travels toward the first polarization separation layer 221 substantially entirely passes through the first polarization separation layer 221 in the direction +Z. Further, the yellow light YLs formed of the S-polarized component that is reflected off the second polarization separation layer 231 and then travels toward the first polarization separation layer 221 is substantially entirely reflected off the first polarization separation layer 221 in the direction +Z. As described above, the light source apparatus 2 according to the present embodiment can use the blue light BLp and the yellow light YLs at increased light use efficiency with almost no loss of the blue light BLp and the yellow light YLs, as compared with the light source apparatus 102 according to Comparative Example.

Quartz, PBH56, and other similar materials exemplified in the present embodiment are more expensive than typical optical glass. However, since the light source apparatus and the projector according to the present embodiment are each compact, the first polarization separator 22 and the second polarization separator 23 are each also compact, whereby an increase in manufacturing cost can be minimized.

In the present embodiment, in which the projector 1 includes the homogenizer 4 located between the light source apparatus 2 and the light modulator 6, the light modulator 6 can be substantially uniformly illuminated with the blue light BLs, the yellow light YLs, the green light GLs, and the red light RLs outputted from the light source apparatus 2. Color unevenness and luminance unevenness in a projection image can thus be suppressed.

In the present embodiment, in which the light modulator 6 includes the microlens array 62 including a plurality of microlenses 621 corresponding to the plurality of pixels PX, the microlenses 621 each allow the four color light fluxes that enter the light modulator 6 to be incident on the corresponding four sub-pixels SX of the liquid crystal panel 61. The color light fluxes outputted from the light source apparatus 2 can thus be efficiently incident on the sub-pixels SX, whereby the color light fluxes can be used at increased efficiency.

Second Embodiment

A second embodiment of the present disclosure will be described below with reference to FIGS. 9 and 10.

The basic configuration of the light source apparatus according to the second embodiment is the same as that in the first embodiment, and the configuration of the reflector differs from that in the first embodiment. The entire light source apparatus will therefore not be described.

Figure 9:
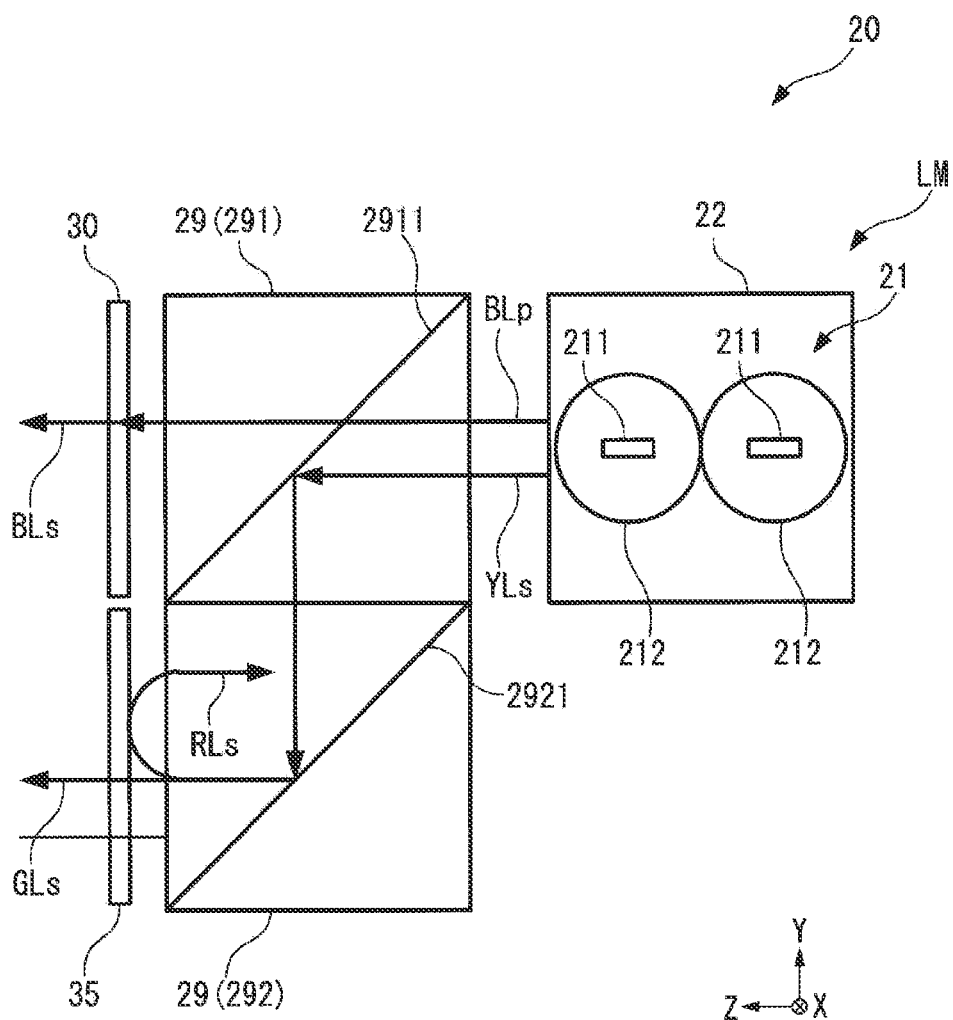
FIG. 9 is a side view of a light source apparatus according to a second embodiment viewed from the negative side of the direction X.

FIG. 9 is a side view of the light source apparatus according to the second embodiment viewed from the direction −X. FIG. 10 is a diagrammatic view showing the light incident positions on a multi-lens that are the positions where the color light fluxes are incident on the multi-lens. In FIG. 9, the rotary phase retardation apparatus 213, the first phase retarder 24, the first light collector 25, and the diffusion apparatus 26 are omitted.

Figure 10:
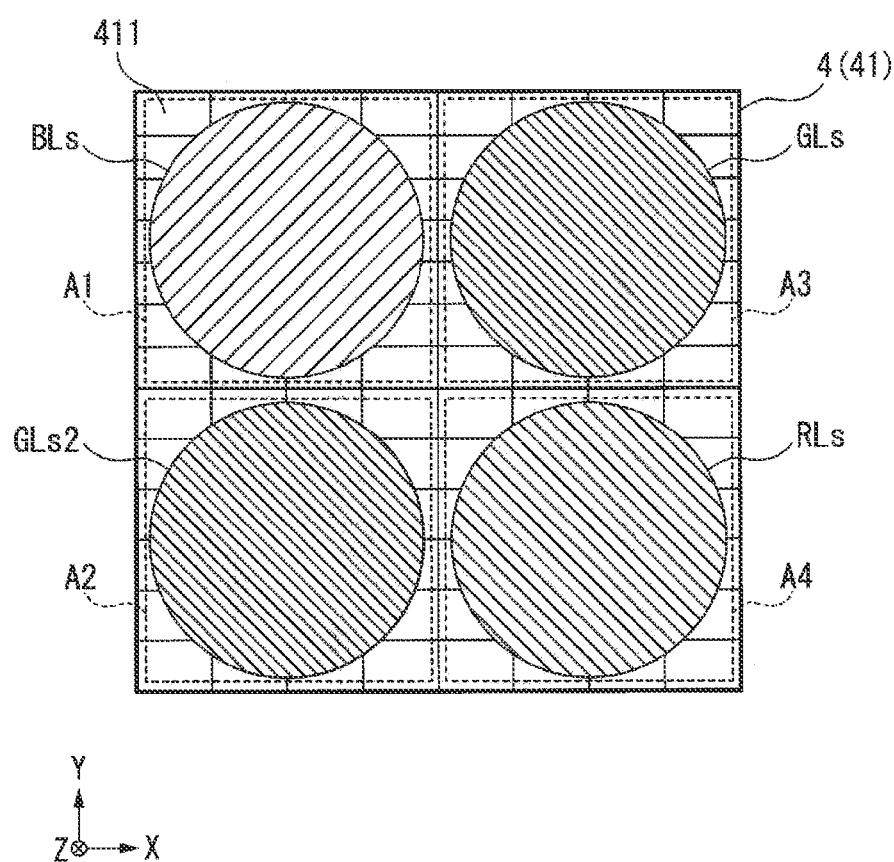
FIG. 10 is a diagrammatic view showing light incident positions on a multi-lens that are the positions where color light fluxes are incident on the multi-lens.

In FIGS. 9 and 10, components common to those in the figures used in the first embodiment have the same reference characters and will not be described.

A light source apparatus 20 according to the present embodiment includes a third color separator 35 in place of the reflector 31 in the light source apparatus 2 according to the first embodiment, as shown in FIG. 9. That is, the third color separator 35 is disposed in a position shifted in the direction +Z from the reflection prism 292 in the optical path of the yellow light YLs separated by the first color separator 29. The third color separator 35 is formed of a dichroic mirror so characterized as to transmit the green light GLs and reflect the red light RLs.

Green light GLs2, which is contained in the yellow light YLs incident from the reflection prism 292 of the first color separator 29 on the third color separator 35, passes through the third color separator 35 and exits out of the light source apparatus 20. That is, the light source apparatus 20 outputs the green light GLs2 in place of the yellow light YLs via a position on the light source apparatus 2 according to the first embodiment that is the position via which the yellow light YLs exits.

Therefore, in the present embodiment, the green light GLs2 that exits via the position via which the yellow light YLs exits in the light source apparatus 2 corresponds to the fourth light in the appended claims.

On the other hand, the red light RLs, which is contained in the yellow light YLs incident on the third color separator 35, is reflected off the third color separator 35 and enters the reflection prism 292 from the direction +Z. The red light RLs enters the wavelength converter 28 via the first color separator 29, the first polarization separator 22, the second polarization separator 23, and the second light collector 27, as the yellow light YLs reflected off the reflector 31 in the light source apparatus 2 according to the first embodiment does.

The yellow phosphor contained in the wavelength converter 28 hardly absorbs yellow light externally incident thereon, as described above, and the yellow phosphor therefore also hardly absorbs the red light RLs. The red light RLs incident on the wavelength converter 28 is therefore repeatedly reflected in the wavelength converter 28 to form nonpolarized red light, which exits out of the wavelength converter 28 along with the yellow light YL generated by the yellow phosphor. Out of the red light emitted from the wavelength converter 28, the red light RLs formed of the S-polarized component is reflected off the third color separator 35 and returns to the wavelength converter 28 again, and the red light formed of the P-polarized component passes through the second polarization separator 23 in the direction +Z and exits out of the light source apparatus 20. The third color separator 35 may instead be a dichroic prism.

The light source apparatus 20 outputs the blue light BLs, the green light GLs2, the green light GLs, and the red light RLs, as shown in FIG. 10. The green light GLs2 exits via a position on the light source apparatus 20 that is a position shifted in the direction −X and the direction −Y and enters the plurality of lenses 411 disposed in the area A2 of the first multi-lens 41 that is an area shifted in the direction −X and the direction −Y. Although not shown, the green light GLs2 enters the microlenses 621 via the first multi-lens 41, the second multi-lens 42, the superimposing lens 43, and the field lens 5, as the yellow light YLs in the first embodiment does. The green light GLs having entered each the microlenses 621 is incident on the second sub-pixel SX2 in the pixel PX corresponding to the microlens 621.

Effects of Second Embodiment

The present embodiment also provides the same effects as those provided by the first embodiment, for example, a light source apparatus 20 capable of outputting a plurality of color light fluxes having an aligned polarization direction can be achieved without use of a polarization converter having a small interval, and the sizes of the light source apparatus 20 and the projector 1 can be reduced.

Further, the light source apparatus 20 according to the second embodiment outputs the green light GLs2 in place of the yellow light YLs in the light source apparatus 2 according to the first embodiment, whereby the amount of green light GLs incident on the pixels PX can be increased. The visibility of a projection image can thus be increased.

The third color separator 35 may instead be a dichroic mirror so characterized as to reflect the green light GLs and transmit the red light RLs, in contrast to the present embodiment. Depending on the yellow phosphor contained in the wavelength converter 28, the red light contained in the yellow light YL emitted from the wavelength converter 28 is insufficient in some cases. In such cases, using the dichroic mirror characterized as described above allows the red light to be incident on the second sub-pixels SX2 and the fourth sub-pixels SX4 out of the four sub-pixels SX1 to SX4. The color reproducibility of a projection image can thus be increased.

The technical range of the present disclosure is not limited to the embodiments described above, and a variety of changes can be made to the embodiments to the extent that the changes do not depart from the substance of the present disclosure.

For example, in the embodiments described above, the position via which the yellow light YLs exits out of the first color separator 29 is a position shifted in the direction −Y from the position via which the blue light BLs exits, and the position via which the red light RLs exits out of the second color separator 33 is a position shifted in the direction −Y from the position via which the green light GLs exits. In place of the arrangement described above, the position via which the yellow light YLs exits out of the first color separator 29 may be a position shifted in the direction +Y from the position via which the blue light BLs exits, and the position via which the red light RLs exits out of the second color separator 33 may be a position shifted in the direction +Y from the position via which the green light GLs exits.

In the embodiments described above, the P-polarized component corresponds to the first polarization component, and the S-polarized component corresponds to the second polarization component. Specifically, the first polarization separator 22 transmits the blue light BLp formed of the P-polarized component, which is the first polarization component, and reflects the blue light BLs formed of the S-polarized component, which is the second polarization component. The second polarization separator 23 reflects the blue light BLp formed of the P-polarized component, which is the first polarization component, transmits the yellow light YLp formed of the P-polarized component, which is the first polarization component, and reflects the yellow light YLs formed of the S-polarized component, which is the second polarization component. The configurations described above are not necessarily employed. The S-polarized component may be the first polarization component, and the P-polarized component may be the second polarization component. In this case, for example, the first polarization separator 22 may reflect the blue light BLp formed of the P-polarized component, which is the second polarization component, transmit the blue light BLs formed of the S-polarized component, which is the first polarization component, and reflect the yellow light YLs formed of the S-polarized component, which is the second polarization component. The second polarization separator 23 may reflect the blue light BLs formed of the S-polarized component, which is the first polarization component, reflect the yellow light YLs formed of the S-polarized component, which is the first polarization component, and transmit the yellow light YLp formed of the P-polarized component, which is the second polarization component. That is, the second polarization separator 23 may be a polarization separator that reflects light formed of the S-polarized component, which is the first polarization component, and transmits light formed of the P-polarized component, which is the second polarization component.

The light source apparatus 2 according to the first embodiment and the light source apparatus 20 according to the second embodiment each include the first light collector 25 and the second light collector 27, but not necessarily. At least one of the first light collector 25 and the second light collector 27 may not be provided.

In the embodiments described above, the light source section 21 outputs the blue light BLs and the blue light BLp in the direction +X, but not necessarily. The light source section 21 may output the blue light BLs and the blue light BLp in a direction that intersects the direction +X, cause the blue light BLs and the blue light BLp to be reflected off, for example, a reflection member, and cause the blue light BLs and the blue light BLp to travel in the direction +X and enter the first polarization separator 22.

In the embodiments described above, the projector includes the homogenizer 4 including the first multi-lens 41, the second multi-lens 42, and the superimposing lens 43. In place of the configuration described above, a homogenizer 4 having another configuration may be provided, or no homogenizer 4 may be provided.

The light source apparatus 2 according to the first embodiment described above and the light source apparatus 20 according to the second embodiment described above output the color light fluxes via four light exiting positions, and the liquid crystal panel 61, which forms the light modulator 6, has four sub-pixels SX in each of the pixels PX. In place of the configuration described above, the light source apparatuses may each output three color light fluxes, and the liquid crystal panel may have three sub-pixels in each of the pixels. In this case, for example, in the light source apparatus according to each of the embodiments described above, a total reflection member may be provided in the optical path of the yellow light YLs.

The light source apparatus 2 according to the first embodiment outputs the blue light BLs, the yellow light YLs, the green light GLs, and the red light RLs, which are each S-polarized light and are spatially separated from one another. The light source apparatus 20 according to the second embodiment outputs the blue light BLs, the green light GLs, and the red light RLs, which are each S-polarized light and are spatially separated from one another. In place of the configurations described above, the color light fluxes outputted by each of the light source apparatuses may each have another polarization state. For example, the light source apparatuses may each be configured to output a plurality of color light fluxes that are each P-polarized light and are spatially separated from one another. The color light fluxes outputted by each of the light source apparatuses are not limited to blue light, yellow light, green light, and red light and may be other color light fluxes. For example, the light source apparatuses may each be configured to output white light in place of the blue light and the yellow light.

In addition to the above, the shape, the number, the arrangement, the material, and other factors of each component of the light source apparatus and the projector are not limited to those in the embodiments described above and can be changed as appropriate. Further, the above embodiments have been described with reference to the case where the light source apparatuses according to the present disclosure are each incorporated in a projector, but not necessarily. The light source apparatus according to each aspect of the present disclosure may be used as a lighting apparatus, a headlight of an automobile, and other components.

What is claimed is:

1. A light source apparatus comprising:
a light source that outputs first light that belongs to a first wavelength band;
a first polarization separator that transmits in a first direction a first polarization component of the first light incident from the light source along the first direction and reflects a second polarization component of the first light in a second direction that intersects the first direction;

a second polarization separator that is disposed in a position shifted in the first direction from the first polarization separator, reflects in the second direction the first polarization component incident from the first polarization separator along the first direction; transmits a third polarization component of second light that belongs to a second wavelength band different from the first wavelength band in a third direction that is opposite the second direction, and reflects a fourth polarization component of the second light in a fourth direction that is opposite the first direction;

a diffuser that is disposed in a position shifted in the second direction from the first polarization separator, diffuses the second polarization component incident from the first polarization separator along the second direction, and causes the diffused second polarization component to exit in the third direction; and a wavelength converter that is disposed in a position shifted in the second direction from the second polarization separator, converts a wavelength of the first polarization component incident from the second polarization separator along the second direction, and causes the second light to exit in the third direction, wherein the first polarization separator includes a first polarization separation layer and first bases so provided as to sandwich the first polarization separation layer, the second polarization separator includes a second polarization separation layer and second bases so provided as to sandwich the second polarization separation layer, and at least one of the first bases and the second bases is made of quartz.

2. A light source apparatus comprising:

a light source that outputs first light that belongs to a first wavelength band;

a first polarization separator that transmits in a first direction a first polarization component of the first light incident from the light source along the first direction and reflects a second polarization component of the first light in a second direction that intersects the first direction;

a second polarization separator that is disposed in a position shifted in the first direction from the first polarization separator, reflects in the second direction the first polarization component incident from the first polarization separator along the first direction, transmits a third polarization component of second light that belongs to a second wavelength band different from the first wavelength band in a third direction that is opposite the second direction, and reflects a fourth polarization component of the second light in a fourth direction that is opposite the first direction;

a diffuser that is disposed in a position shifted in the second direction from the first polarization separator, diffuses the second polarization component incident from the first polarization separator along the second direction, and causes the diffused second polarization component to exit in the third direction; and a wavelength converter that is disposed in a position shifted in the second direction from the second polarization separator, converts a wavelength of the first polarization component incident from the second polarization separator along the second direction, and causes the second light to exit in the third direction, wherein the first polarization separator includes a first polarization separation layer and first bases so provided as to sandwich the first polarization separation layer, the second polarization separator includes a second polarization separation layer and second bases so provided as to sandwich the second polarization separation layer, and at least one of the first bases and the second bases is made of a material that absorbs light that belongs to the first wavelength band at a light absorption factor smaller than or equal to 0.1% per length t=10 mm, where t represents an optical path length of light in the first bases and the second bases.

3. A light source apparatus comprising:

a light source that outputs first light that belongs to a first wavelength band;

a first polarization separator that transmits in a first direction a first polarization component of the first light incident from the light source along the first direction and reflects a second polarization component of the first light in a second direction that intersects the first direction;

a second polarization separator that is disposed in a position shifted in the first direction from the first polarization separator; reflects in the second direction the first polarization component incident from the first polarization separator along the first direction, transmits a third polarization component of second light that belongs to a second wavelength band different from the first wavelength band in a third direction that is opposite the second direction, and reflects a fourth polarization component of the second light in a fourth direction that is opposite the first direction;

a diffuser that is disposed in a position shifted in the second direction from the first polarization separator, diffuses the second polarization component incident from the first polarization separator along the second direction, and causes the diffused second polarization component to exit in the third direction; and a wavelength converter that is disposed in a position shifted in the second direction from the second polarization separator, converts a wavelength of the first polarization component incident from the second polarization separator along the second direction, and causes the second light to exit in the third direction, wherein the first polarization separator includes a first polarization separation layer and first bases so provided as to sandwich the first polarization separation layer, the second polarization separator includes a second polarization separation layer and second bases so provided as to sandwich the second polarization separation layer, and at least one of the first bases and the second bases is made of a material having a photoelastic constant smaller than or equal to 0.1 nm/cm/105 Pa.

4. The light source apparatus according to claim 1, further comprising a first phase retarder which is provided between the first polarization separator and the diffuser and on which the second polarization component is incident from the first polarization separator.

5. The light source apparatus according to claim 1, further comprising a second phase retarder that converts the third polarization component that exits out of the second polarization separator in the third direction into the fourth polarization component.

6. The light source apparatus according to claim 1, wherein the light source includes a light emitting device and a third phase retarder on which light outputted from the light emitting device is incident and which outputs the first light containing the first polarization component and the second polarization component.

7. The light source apparatus according to claim 6, wherein the third phase retarder is rotatable around an axis of rotation along a traveling direction of light incident on the third phase retarder.

8. The light source apparatus according to claim 1, further comprising:
   a first color separator that is disposed in a position shifted in the third direction from the first polarization separator and separates light that exits out of the first polarization separator into third light that belongs to the first wavelength band and fourth light that belongs to the second wavelength band; and
   a second color separator that is disposed in a position shifted in the third direction from the second polarization separator and separates light that exits out of the second polarization separator into fifth light that belongs to a third wavelength band different from the second wavelength band and sixth light that belongs to a fourth wavelength band different from the second wavelength band and the third wavelength band.

9. A projector comprising:
   the light source apparatus according to claim 8;
   a light modulator that modulates light from the light source apparatus in accordance with image information; and
   a projection optical apparatus that projects the light modulated by the light modulator.

10. The projector according to claim 9,
   further comprising a homogenizer provided between the light source apparatus and the light modulator,
   wherein the homogenizer includes
      two multi-lenses that divide the light incident from the light source apparatus into a plurality of sub-light fluxes, and
      a superimposing lens that superimposes the plurality of sub-light fluxes incident from the two multi-lenses on one another on the light modulator.

11. The projector according to claim 10,
   wherein the light modulator includes a liquid crystal panel having a plurality of pixels and a microlens array provided on a light incident side of the liquid crystal panel and including a plurality of microlenses corresponding to the plurality of pixels,
   the plurality of pixels each have a first sub-pixel, a second sub-pixel, a third sub-pixel, and a fourth sub-pixel, and
   the microlenses cause the third light to be incident on the first sub-pixels, the fourth light to be incident on the second sub-pixels, the fifth light to be incident on the third sub-pixels, and the sixth light to be incident on the fourth sub-pixels.

12. The light source apparatus according to claim 2, further comprising:
   a first color separator that is disposed in a position shifted in the third direction from the first polarization separator and separates light that exits out of the first polarization separator into third light that belongs to the first wavelength band and fourth light that belongs to the second wavelength band; and
   a second color separator that is disposed in a position shifted in the third direction from the second polarization separator and separates light that exits out of the second polarization separator into fifth light that belongs to a third wavelength band different from the second wavelength band and sixth light that belongs to a fourth wavelength band different from the second wavelength band and the third wavelength band.

13. A projector comprising:
   the light source apparatus according to claim 12;
   a light modulator that modulates light from the light source apparatus in accordance with image information; and
   a projection optical apparatus that projects the light modulated by the light modulator.

14. The projector according to claim 13,
   further comprising a homogenizer provided between the light source apparatus and the light modulator,
   wherein the homogenizer includes
      two multi-lenses that divide the light incident from the light source apparatus into a plurality of sub-light fluxes, and
      a superimposing lens that superimposes the plurality of sub-light fluxes incident from the two multi-lenses on one another on the light modulator.

15. The projector according to claim 14,
   wherein the light modulator includes a liquid crystal panel having a plurality of pixels and a microlens array provided on a light incident side of the liquid crystal panel and including a plurality of microlenses corresponding to the plurality of pixels,
   the plurality of pixels each have a first sub-pixel, a second sub-pixel, a third sub-pixel, and a fourth sub-pixel, and
   the microlenses cause the third light to be incident on the first sub-pixels, the fourth light to be incident on the second sub-pixels, the fifth light to be incident on the third sub-pixels, and the sixth light to be incident on the fourth sub-pixels.

16. The light source apparatus according to claim 3, further comprising:
   a first color separator that is disposed in a position shifted in the third direction from the first polarization separator and separates light that exits out of the first polarization separator into third light that belongs to the first wavelength band and fourth light, that belongs to the second wavelength band; and
   a second color separator that is disposed in a position shifted in the third direction from the second polarization separator and separates light that exits out of the second polarization separator into fifth light that belongs to a third wavelength band different from the second wavelength band and sixth light that belongs to a fourth wavelength band different from the second wavelength band and the third wavelength band.

17. A projector comprising:
   the light source apparatus according to claim 16;
   a light modulator that modulates light from the light source apparatus in accordance with image information; and
   a projection optical apparatus that projects the light modulated by the light modulator.

18. The projector according to claim 17,
   further comprising a homogenizer provided between the light source apparatus and the light modulator,
   wherein the homogenizer includes
      two multi-lenses that divide the light incident from the light source apparatus into a plurality of sub-light fluxes, and
      a superimposing lens that superimposes the plurality of sub-light fluxes incident from the two multi-lenses on one another on the light modulator.

19. The projector according to claim 18,
a display device; and
wherein the light modulator includes a liquid crystal panel having a plurality of pixels and a microlens array provided on a light incident side of the liquid crystal panel and including a plurality of microlenses corresponding to the plurality of pixels,
the plurality of pixels each have a first sub-pixel, a second sub-pixel, a third sub-pixel, and a fourth sub-pixel, and
the microlenses cause the third light to be incident on the first sub-pixels, the fourth light to be incident on the second sub-pixels, the fifth light to be incident on the third sub-pixels, and the sixth light to be incident on the fourth sub-pixels.

* * * * *